(12) United States Patent
Ingrassia, Jr. et al.

(10) Patent No.: US 6,275,230 B1
(45) Date of Patent: *Aug. 14, 2001

(54) METHOD FOR MANAGING STATES WITHIN ACTIVEX CONTROLS SIMPLIFYING CTI ENABLED APPLICATION DEVELOPMENT

(75) Inventors: Michael I. Ingrassia, Jr.; Alexander Rios, both of Edison; James A. Shelton, Holmdel, all of NJ (US); John A. Yaggie, Springboro, OH (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,620

(22) Filed: Aug. 22, 1997

(51) Int. Cl.[7] ............................... G06F 3/00; H04M 3/60
(52) U.S. Cl. .......................... 345/348; 345/349; 345/354; 345/333; 345/967; 345/970; 379/267
(58) Field of Search ................................ 345/333–334, 345/347–349, 352, 354, 967, 969, 970; 379/267, 223, 93.23, 100.14

(56) References Cited

U.S. PATENT DOCUMENTS

| | | | | |
|---|---|---|---|---|
| 4,653,090 | * | 3/1987 | Hayden | 379/204 |
| 4,953,159 | * | 8/1990 | Hayden et al. | 370/265 |
| 5,195,086 | * | 3/1993 | Baumgartner et al. | 345/349 X |
| 5,396,591 | * | 3/1995 | Goss | 345/347 |
| 5,455,854 | * | 10/1995 | Dilts et al. | 379/201 |
| 5,522,089 | * | 5/1996 | Kikinis et al. | 395/893 |
| 5,533,110 | * | 7/1996 | Pinard et al. | 379/201 |
| 5,914,714 | * | 6/1999 | Brown | 345/348 X |

* cited by examiner

Primary Examiner—Raymond J. Bayerl
Assistant Examiner—X. L. Bautista
(74) Attorney, Agent, or Firm—Ying Tuo; Lowe Hauptman Gopstein Gilman & Berner LLP

(57) ABSTRACT

Described is a method of creating intelligent command objects for controlling a telephony system by selecting reusable image symbol to an application container, without requiring an application developer to write any programming code. After being embedded into CTI, these command objects are able to automatically monitor the operation status and enable and disable themselves according to the changes of the operation status of the telephony hardware system. To control the operation of the telephony system, a user simply activates (i.e. clicks) a respective command object when it is enabled.

20 Claims, 28 Drawing Sheets

FIG. 6B

|  | Make | Answer | Hangup | Hold | Reconnect | XInit | XCancel | XComplete | CInit | CCancel | CComplete | AfterCall |
|---|---|---|---|---|---|---|---|---|---|---|---|---|
| Null | TRUE | FALSE | FALSE | FALSE | FALSE | FALSE | FALSE | FALSE | FALSE | FALSE | FALSE | FALSE |
| Incoming | TRUE | TRUE | FALSE | FALSE | FALSE | FALSE | FALSE | FALSE | FALSE | FALSE | FALSE | FALSE |
| Ringing | FALSE | FALSE | TRUE | TRUE | FALSE | TRUE | FALSE | FALSE | TRUE | FALSE | FALSE | FALSE |
| Busy | FALSE | FALSE | TRUE | TRUE | FALSE | FALSE | FALSE | FALSE | FALSE | FALSE | FALSE | FALSE |
| Queued | FALSE | FALSE | TRUE | TRUE | FALSE | FALSE | FALSE | FALSE | FALSE | FALSE | FALSE | FALSE |
| Connected | FALSE | FALSE | TRUE | TRUE | FALSE | TRUE | FALSE | FALSE | TRUE | FALSE | FALSE | FALSE |
| Onhold | FALSE | FALSE | FALSE | FALSE | TRUE | FALSE | FALSE | FALSE | FALSE | FALSE | FALSE | FALSE |
| XRinging | FALSE | FALSE | FALSE | FALSE | FALSE | TRUE | TRUE | FALSE | FALSE | FALSE | FALSE | FALSE |
| XBusy | FALSE | FALSE | FALSE | FALSE | FALSE | FALSE | TRUE | FALSE | FALSE | FALSE | FALSE | FALSE |
| XQueued | FALSE | FALSE | FALSE | FALSE | FALSE | FALSE | TRUE | FALSE | FALSE | FALSE | FALSE | FALSE |
| XConnect | FALSE | FALSE | FALSE | FALSE | FALSE | FALSE | TRUE | TRUE | FALSE | FALSE | FALSE | FALSE |
| InXfer | FALSE | FALSE | FALSE | FALSE | FALSE | FALSE | FALSE | FALSE | FALSE | FALSE | FALSE | FALSE |
| CRinging | FALSE | FALSE | FALSE | FALSE | FALSE | FALSE | FALSE | FALSE | FALSE | TRUE | FALSE | FALSE |
| CBusy | FALSE | FALSE | FALSE | FALSE | FALSE | FALSE | FALSE | FALSE | FALSE | TRUE | FALSE | FALSE |
| CQueued | FALSE | FALSE | FALSE | FALSE | FALSE | FALSE | FALSE | FALSE | FALSE | TRUE | FALSE | FALSE |
| CConnect | FALSE | FALSE | FALSE | FALSE | FALSE | FALSE | FALSE | FALSE | FALSE | TRUE | TRUE | FALSE |
| InConf | FALSE | FALSE | TRUE | TRUE | FALSE | TRUE | FALSE | FALSE | TRUE | FALSE | FALSE | FALSE |
| AterCall | FALSE | FALSE | FALSE | FALSE | FALSE | FALSE | FALSE | FALSE | FALSE | FALSE | FALSE | TRUE |

METHOD FOR MANAGING STATES WITHIN ACTIVEX CONTROLS SIMPLIFYING CTI ENABLED APPLICATION DEVELOPMENT

BACKGROUND OF THE INVENTION

The present invention relates generally to a method for developing graphical user interfaces for CTI appliactions.

Computer Telephony Integration (CTI) enables a computer system to control a telephony system and a telephony system to access a computer system. While the existing CTI development methods are often robust, a shortcoming of the existing CTI development methods is that it is difficult to use them to develop end user CTI interfaces, because they require developers and integrators to understand the details of how a particular telephony system works internally. A main contributing reason to such a shortcoming is the lack of an accepted standard for telephony integration, which has led to the development of several proprietary and non-proprietary interfaces to the various telephony hardware vendor platforms.

Therefore, there is a need to provide a method for designing CTI solutions, which is easy to use by CTI system developers and integrators.

There has been another need to provide a method for designing CTI solutions, without requiring the knowledge of details of telephony systems, thus simplifying and improving the efficiency of CTI application development and maintenance.

The present invention meets these needs.

SUMMARY OF THE INVENTION

In one aspect, the invention provides a method for controlling a communication system. The method comprises the steps of:
 (a) creating an object image symbol for controlling and responding to the communication system;
 (b) defining a behavior for said created object image symbol; and
 (c) based on said defined behavior, dynamically enabling and disabling said object image symbol in response to changes of operational status of the communication system.

In another aspect, the invention provides a method for controlling a communication system. The method comprises the steps of:
 (a) creating an object image symbol for controlling and responding to the communication system;
 (b) defining a behavior for said created object image symbol; and
 (c) based on said defined behavior, initiating a control over the communication system by activating said object image symbol.

These and other features and advantages of the present invention will become apparent from the following description and accompanying drawings.

BRIEF DESCRIPTION OF THE DRAWINGS

FIGS. 4–5, 6A, 6B, and 7–9 outline a process for creating a command button, in accordance with the present invention;

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiments will be readily apparent to those skilled in the art, and the principles defined herein may be applied to other embodiments and applications without departing from the spirit and scope of the invention. Thus, the present invention is not intended to be limited to the embodiments shown, but is to be accorded with the broadest scope consistent with the principles and features disclosed herein.

Figure 1:
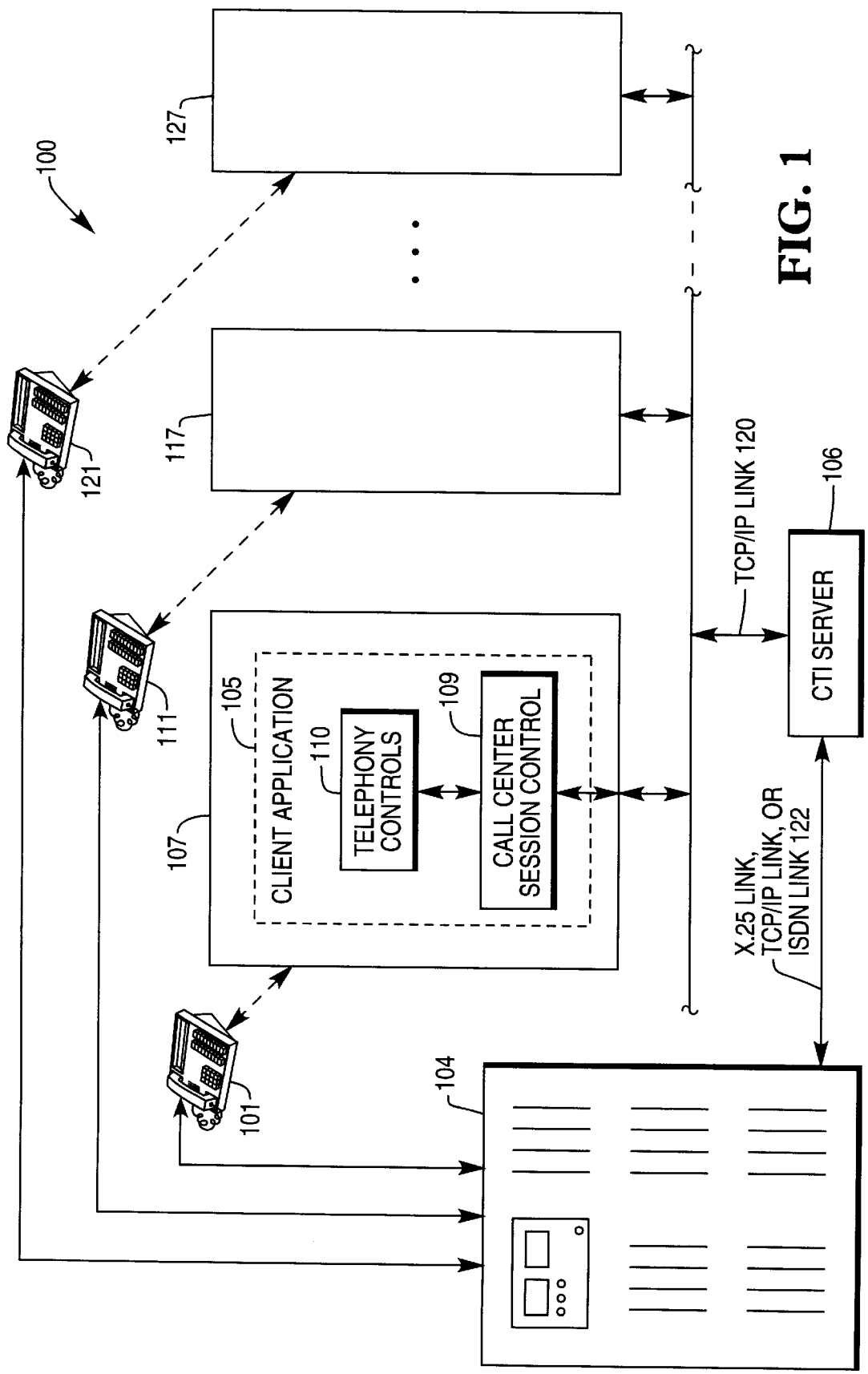
FIG. 1 is a block diagram for a CTI system, in accordance with the present invention.

Referring to FIG. 1, there is shown a block diagram for a CTI system 100 in accordance with the present invention.

As shown in FIG. 1, the CTI system includes a telephony hardware 104, a CTI server 106, a plurality of telephone sets (101, 111, . . . , 121), and a plurality of workstations (107, 117, . . . , 127). As indicated by dotted line, the plurality of workstations (107, 117, . . . , 127) are associated with the plurality of telephone sets (101, 111, . . . , 121) respectively. Specifically, a workstation and an associated telephone set are located in close vicinity so that an agent can conveniently operate both the workstation and the associated telephone set. The plurality of telephone sets are controlled by telephony hardware 104 (i.e. a switch or PBX—Private Branch Exchange) to receive or place a call.

Described as a representative of the plurality of the workstations, workstation 107 contains a client application 105, which includes two software components: a call center session control 109 and telephony controls 110.

Telephony hardware 104 can be used in a call center facility, which typically includes a set of telephones, a set of communication lines, a telephone switch (such as PBX), a plurality of workstations, and at least one computer system. A telephone switch is designed to switch incoming calls from the outside world to a set of telephones installed in a building, and enables a group of users to share a fixed set of communication lines connected to the outside world. For example, a building with 1000 telephones may share 200 outside lines from a telephone central office. A typical call center may have many agents with each of them using one or more telephones to communicate with each other. An agent can use a workstation to interact with the telephony hardware, the computer system, the incoming calls, and the other agents, to serve the business needs of a call center. For example, the agents in a call center can use workstations to process customer calls to provide billing or credit card service.

In FIG. 1, CTI server 106 is a combination of hardware and software (a computer system and the server software run on the computer system). CTI server 106 includes the software components to: (1) control telephony hardware 104 (i.e. a telephone switch or PBX) to route telephone calls, (2) notify the software running on a workstation of the arrival of a call to a telephone associated with the workstation and the changes of the call state (i.e. a call is ringing, is on hold, is being transferred, is hung up, etc.), and (3) enable the application running on a workstation to control a call to a telephone associated with the workstation. CTI server 106 may also contain special hardware to interact with telephony hardware 104.

Telephony controls 110 contain a plurality of individual controls (or individual control commands) with each of them being able to perform a specific control task.

Call center session control 109 is able to establish a connection to CTI server 106, and to monitor and manage all events and requests to and from a CTI environment. Events are notifications of activities (or call states) that have happened or are happening on telephony hardware 104. For example, the ringing event is the notification from a CTI server to a client (i.e. the application running on a workstation) that a telephone is ringing. Requests are commands issued by the application running on a workstation to ask for services to be performed (i.e. send all events received on telephone extension 4000 to the application, place the current call on extension 4000 on hold, transfer the current call on extension 4000 to extension 4001, etc.).

Figure 2:
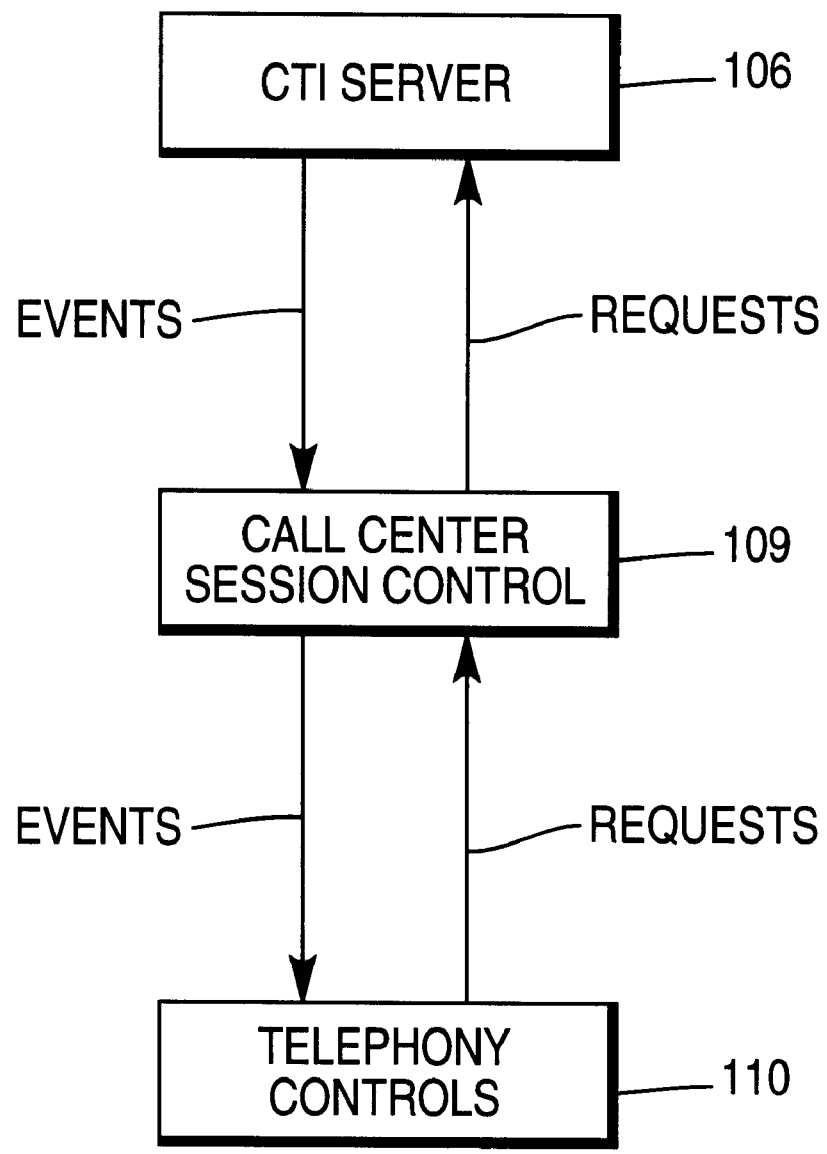
FIG. 2 is a block diagram of signaling flow between the CTI server and telephony controls in accordance with the present invention.

Referring to FIG. 2, there is shown a block diagram illustrating signaling flow between CTI server 106 and telephony controls 110. As shown in FIG. 2, call center session control 109 processes the signaling flow between CTI server 106 and telephony controls 110. More specifically, call center session control 109 receives any events from CTI server 106, and forwards these events to appropriate individual controls in telephony controls 110 upon identifying which of the controls should be informed about these events. Call center session control 109 also receives any requests from telephony controls 110 and informs CTI server 106 to perform the controls in response to these requests.

The advantages for the signaling flow shown in FIG. 2 are at least two-folds:

First, all the complex program code required to properly connect each of the individual controls in telephony controls 110 to a CTI environment is solely processed by call center session control 109. Each individual control in telephony controls 110 is only responsible for acting on designated events sent to it by call session control 109.

Second, new controls can be easily developed and added into a CTI system. All that is needed is to design the program code required to respond to the respective events and register this newly developed control to call center session control 109. To keep track of the registration of individual controls, call session control 109 maintains a list, which contains the names of the individual controls and the events designated to respective individual controls. By adding the name of the newly developed control and the designated events to the list, the control is added in call center session control 109.

In the embodiment shown in FIG. 1, the individual controls in telephony controls 110 are created on ActiveX platform. ActiveX is a software technology developed by Microsoft® for object oriented development of reusable software components. A control (or command) designed on ActiveX platform is an object that associates with methods, properties, and events unique to it.

Figure 3:
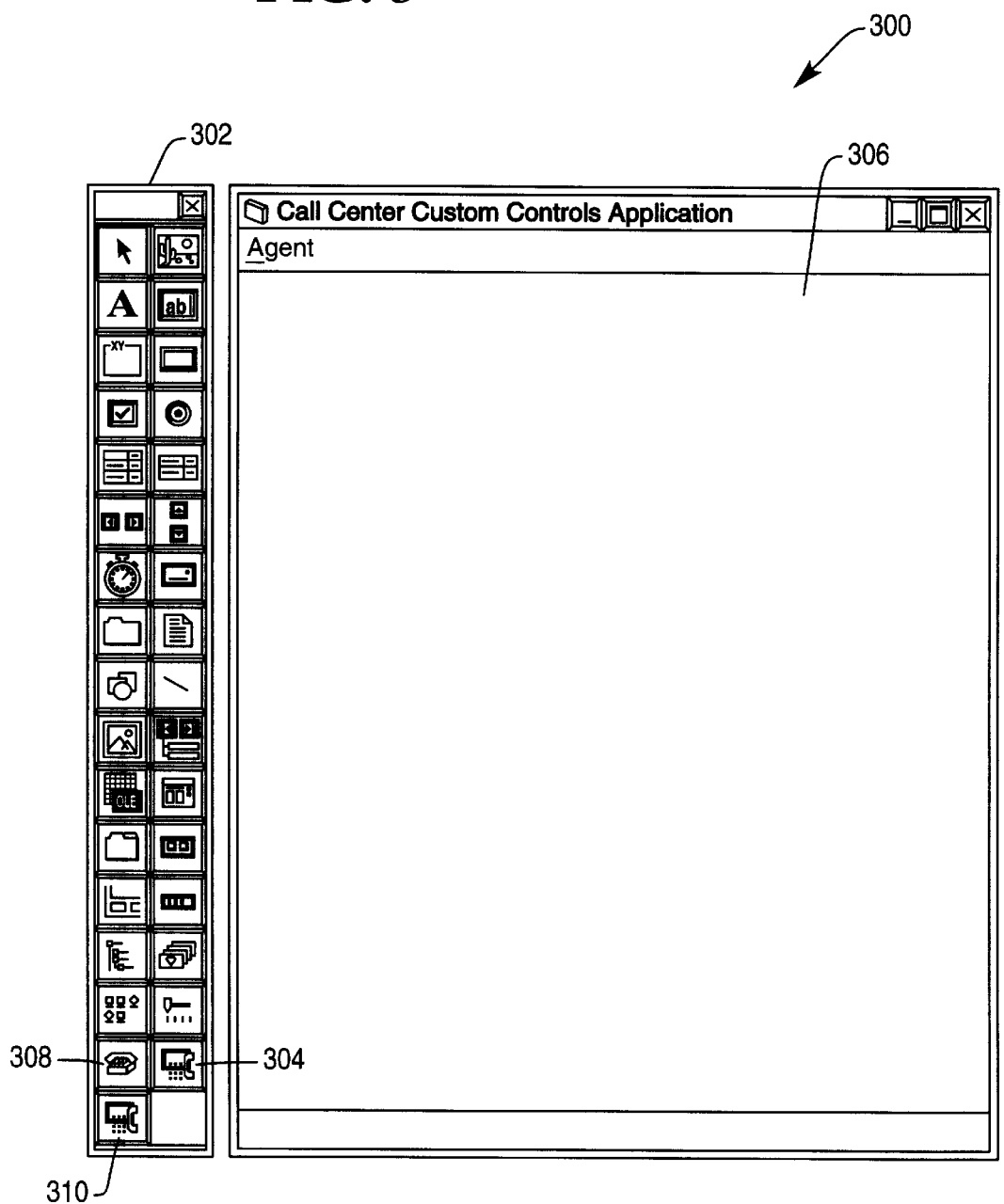
FIG. 3 is a screen display containing a tool bar for creating telephony controls, in accordance with the present invention.

Referring to FIG. 3, there is shown a screen display 300 on workstation 107, illustrating a typical development environment for creating applications with ActiveX controls. This interface provides a means of creating a specific control (or command) in telephony controls 110 for an application, in accordance with the present invention.

As shown in FIG. 3, screen display 300 contains a tool bar set 302, which further contains two image symbols, namely: (1) Telephony Control symbol 304, and (2) Call Center Session symbol 308.

Referring to FIGS. 4–5, 6A, 6B, and 7–9, there are shown a process for creating a command button, in accordance with the present invention.

Figure 4:
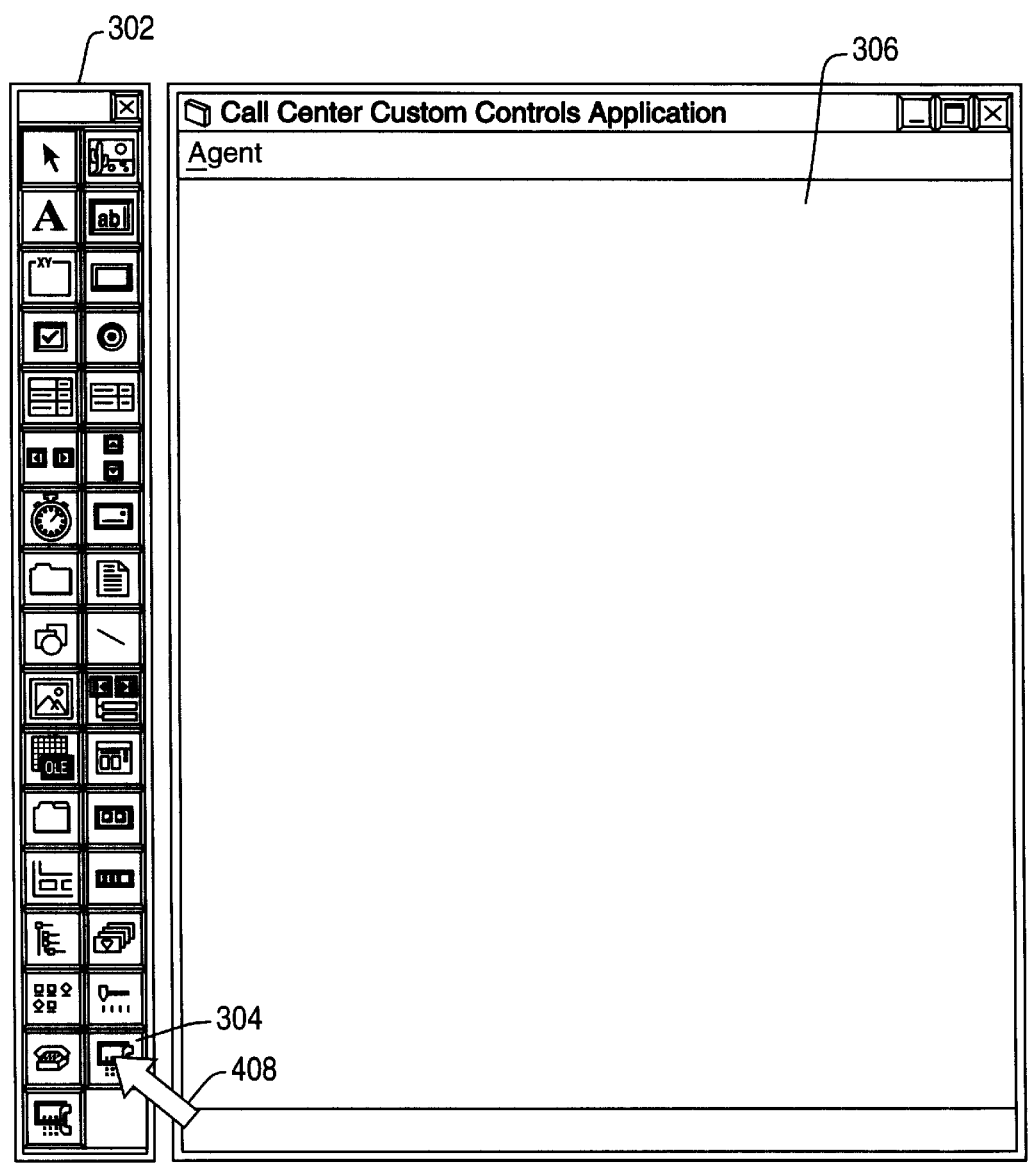

As shown in FIG. 4, a cursor 408 (represented as an arrow) points to Telephony Control symbol 304. The cursor can be moved to any position on screen display 300 by a mouse (not shown). Moving the mouse while pressing the button on the mouse, a command button can be created within application container 306 by selecting Telephony Control symbol 304.

Figure 5:
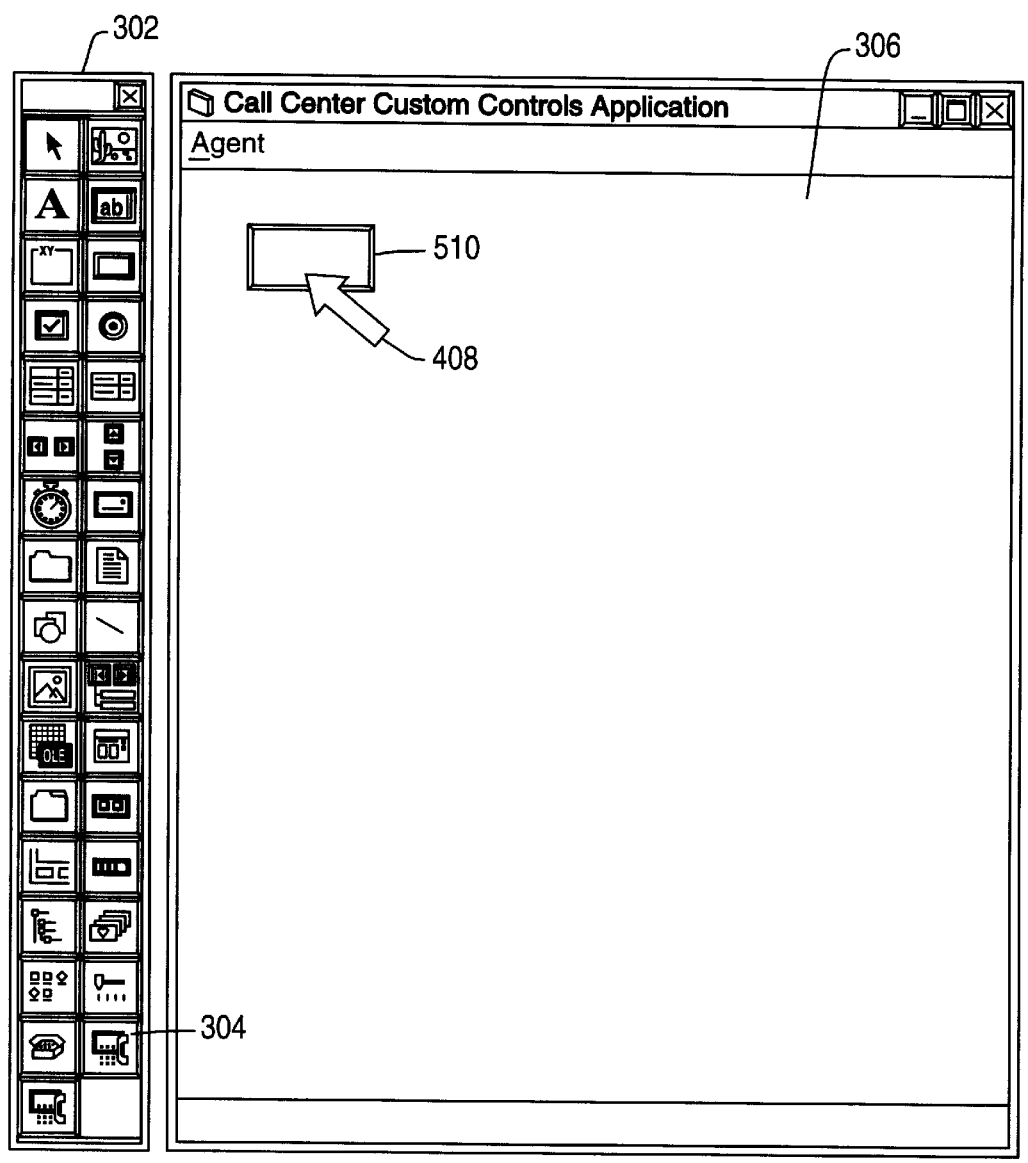

Referring to FIG. 5, there is shown a command button 510 created by the process shown in FIG. 4.

Figure 6A:
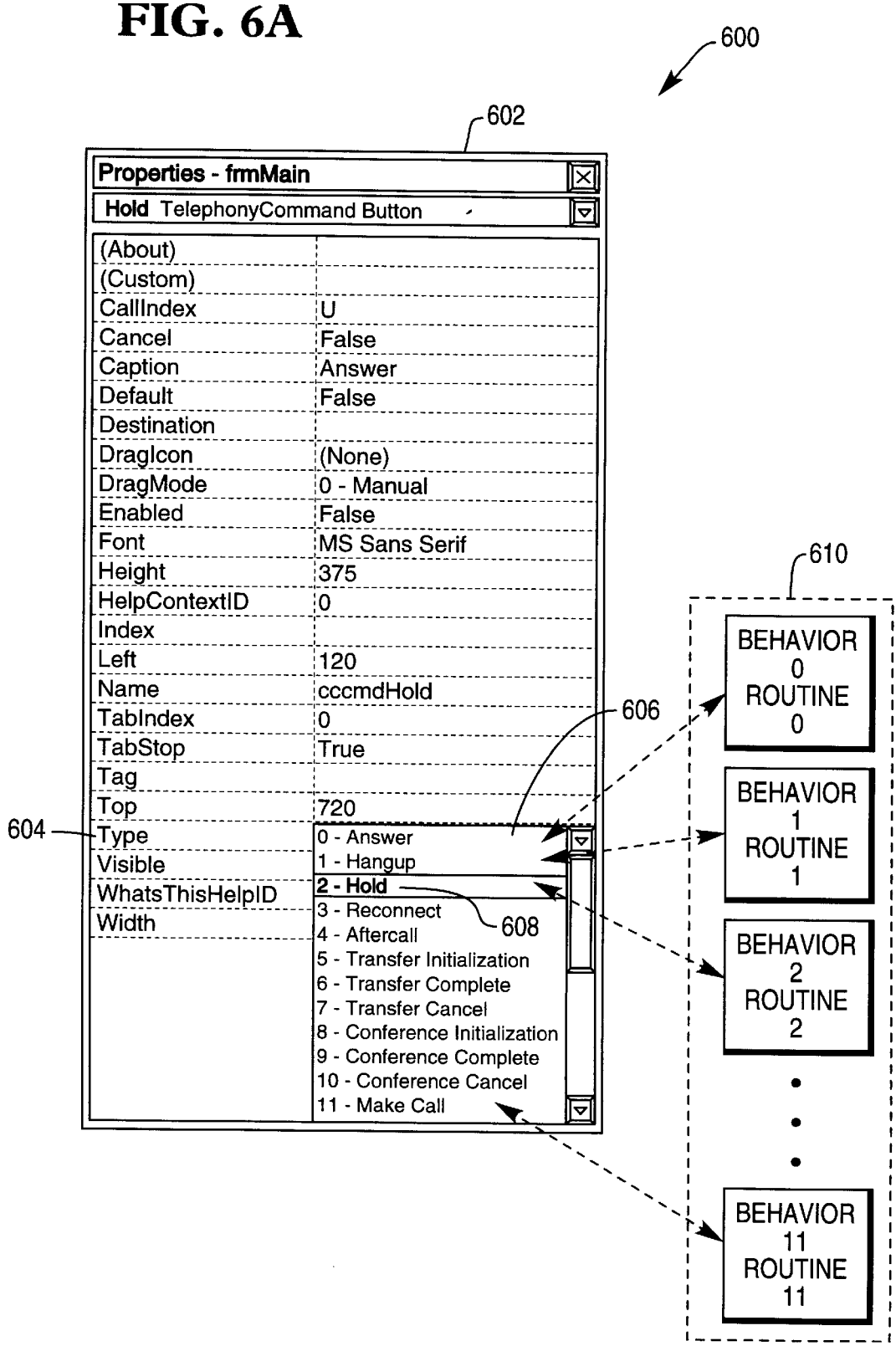

Referring to FIG. 6A, there is shown a screen display 600 on workstation 107, illustrating a property table 602 containing the properties for a command button. Property table 602 can be invoked by right clicking (using a mouse) a command button (i.e. command button 510).

As shown in FIG. 6A, property table 602 contains a pull down list box 606. The pull down list box includes twelve (12) types of command buttons being associated with twelve different behaviors, namely: (0) Answer, (1) Hangup, (2) Hold, (3) Reconnect, (4) Aftercall, (5) Transfer Initialization (XInit), (6) Transfer Complete (XComplete), (7) Transfer Cancel (XCancel), (8) Conference Initialization (CInit), (9) Conference Complete (CComplete), (10) Conference Cancel (CCancel), and (11) Make Call. As indicated by dotted lines in FIG. 6A, each type of command button associates with a unique behavior (or a unique control task). The unique behavior (or a unique control task) is performed by a respective routine in control program 610. For example, entry 608 (Hold type of command button) associates with behavior 2, and routine 2 for controlling of holding a call.

Pull down list box 606 can be invoked by selecting type entry 604 using the mouse (not shown). By selecting a specific entry in pull down list box 606, a behavior attributed to a respective command button type can be assigned to a created command button (i.e. command button 510), and control program 610 and a respective routine for performing the behavior are linked to the created command button. In this particular case, entry 608 (Hold type) is selected for command button 510. In response to the selection of entry 608, control program 610 and routine 2 (which is programmed to exhibit the behavior attributed to a "Hold" command button) are linked to command button 510.

Alternatively, command button 510 can be created by a line of Visual Basic code:

cccmdHold=create(TelephonyCommandButton)

and command button 510 can be linked to control program 610 and routine 2 by a line of Visual Basic code:

cccmdHold.type=Hold where "cccmd" stands for "call center command", and "Hold" has a constant value 2.

Being activated (i.e. clicked) in an active state, Answer type of command button is able to generate a request to CTI server 106 to instruct telephony hardware 104 (a switch or PBX) to connect an incoming call to a telephone set; Hangup type of command button is able to generate a request to CTI server 106 to instruct telephony hardware 104 to drop a current call; Aftercall type of command button is able to generate a request to CTI server 106 to instruct telephony hardware 104 to complete aftercall work; Hold type of command button is able to generate a request to CTI server 106 to instruct telephony hardware 104 to place a current call on hold; Reconnect type of command button is able to generate a request to CTI server 106 to instruct telephony hardware 104 to connect an on-hold call; Transfer Initiation type of command button is able to generate a request to CTI server 106 to instruct telephony hardware 104 to transfer a current call to a different extension; Transfer Complete type of command button is able to generate a request to CTI server 106 to instruct telephony hardware 104 to complete the transfer of the current call; Transfer Cancel type of command button is able to generate a request to CTI server 106 to instruct telephony hardware 104 to cancel an initiated transfer of the current call; Conference Initiation type of command button is able to generate a request to CTI server 106 to instruct telephony hardware 104 to initiate a conference call; Conference Complete type of command button is able to generate a request to CTI server 106 to instruct telephony hardware 104 to complete an initiated conference call; Conference Cancel type of command button is able to generate a request to CTI server 106 to instruct telephony hardware 104 to cancel an initiated conference call; and Make Call type of command button is able to generate a request to CTI server 106 to instruct telephony hardware 104 to make an outbound call.

In a client application, the twelve types of command buttons can be automatically enabled (set in an active state) or disabled (set in an inactive state) depending on the eighteen (18) call states of a telephone set associated with the client application. For example, in FIG. 1, the states of the command buttons in client application 105 depend on the call states of telephone set 101. The eighteen (18) call states are listed as the following:

1. Call State Null (Null)—No call exists to the associated telephone set.
2. Call State Incoming (Incoming)—A new call (previously Null at the associated telephone set) has been directed to the associated telephone set.
3. Call State Queued (Queued)—A new call (previously Null at the associated telephone set) has been made from the associated telephone set and is queued in a telephone switch (i.e. PBX) waiting for an available telephone set.
4. Call State Ringing (Ringing)—A new call (previously Null or Queued at the associated telephone set) has been has been made from the associated telephone set and is ringing a specified destination telephone set.
5. Call State Busy (Busy)—A new call (previously Null at the associated telephone set) has been has been made from the associated telephone set, but the specified destination telephone set is busy.
6. Call State Connected (Connected)—The previously Incoming call (or a call) has been Connected and voice communication is possible.
7. Call State On Hold (OnHold)—The previously Connected or Ringing, or Busy call has been placed on hold.
8. Call State Transfer Queued (XQueued)—A Connected or Ringing call has been Transfer Initiated from the associated telephone set and is queued waiting for an available telephone set.
9. Call State Transfer Ring (XRinging)—The previous Transfer Queued, Connected, or Ringing call is now ringing at the transfer destination telephone set.
10. Call State Transfer Busy (Xbusy)—The previously Connected or Ringing call is busy at its destination telephone set (i.e. the destination telephone set is busy).
11. Call State Transfer Connected (XConnet)—The previously Transfer Ringing call has been answered at its destination and both the local party and remote party are connected (voice communications are possible).
12. Call State In Transfer (InXfer)—The previously Transfer Connected call has been transfer-completed by its initiator; this state is transient and will exist until the local party is disconnected by the switch (i.e. a PBX).
13. Call State Conference Queued (CQueued)—A previously Connected or Ringing call has been Conference Initiated from the associated telephone set and is queued waiting for an available telephone set.
14. Call State Conference Ringing (CRinging)—The previously Connected or Ringing call has been Conference Initiated from the associated telephone set and is now ringing at the conference destination telephone set(s).
15. Call State Conference Busy (CBusy)—The previously Connected or Ringing call has been Conference Initiated from the associated telephone set and now busy at the conference destination telephone set (the destination telephone set is busy).
16. Call state Conference Connected (CConnected)—The previously Conference Ringing call has been answered at its destination and both the local party and remote party are connected (voice communications are possible).
17. Call State In Conference (InConf)—The previously Conference Connected call has been conference completed at the initiating telephone set and voice communications are possible.
18. Call State After Call (AfterCall) The previously Connected, Transfer Connected, Conference Connected or In Conference call has been hung up or transferred completed (all other interested parties have dropped off), and has now been placed in this state because the session telephone set was in the Manual-In telephone set state when this call arrived. (Manual-In is a special feature of G3V4 PBX manufactured by Lucent. Under this feature, a telephone can be set up to automatically answer itself when a call comes in, or it can be set up to require an agent to type a code in on a key pad to inform the PBX that he/she is ready to receive the call. The feature requiring the agent to manually inform the readiness to the PBX is called "Manual-In.").

Referring to FIG. 6B, there is shown a table A that indicates under what call states a type of command button will be enabled or disabled.

In table A, the horizontal dimension lists the twelve (12) types of command buttons, and the vertical dimension lists the eighteen (18) call states. A value of TRUE in a cross section indicates that a respective type of command button in the horizontal dimension is enabled corresponding to the respective call state in the vertical dimension. A value of FALSE in a cross section indicates that a respective type of command button in the horizontal dimension is disabled corresponding to the respective call state in the vertical dimension.

For example, according to table A, a Make Call (Make) type command button is only enabled when a current call is either in Null (there is no call at the associated telephone set) or Incoming state (the associated telephone set is ringing on hook), and is disabled when all calls are in the other states. The Answer type command button is only enabled when the current call state is in Incoming state, and is disabled when in any other states.

CTI server 106 constantly monitors the telephone (i.e. telephone 101) associated with the workstation (i.e. workstation 107) for the events. When an event is received from CTI server 106, Call Center Session Control 109 forwards event information to the appropriate command buttons. Control program 610 (including routines 0–11) constantly monitoring: (1) the events sent from CTI server 106, and (2) activations of the respective command buttons by a user. In response to these events, the control program enables or disables respective command buttons, according to table A shown in FIG. 6B. In response to activations of the respective command buttons, control program 610 selectively executes respective routines (shown in FIG. 6A) to send respective requests to CTI server 106 via call center session control 109, provided the respective command buttons are enabled (in an active state). In response to the respective requests, CTI server 106 performs controls over telephony hardware 104.

Figure 7:
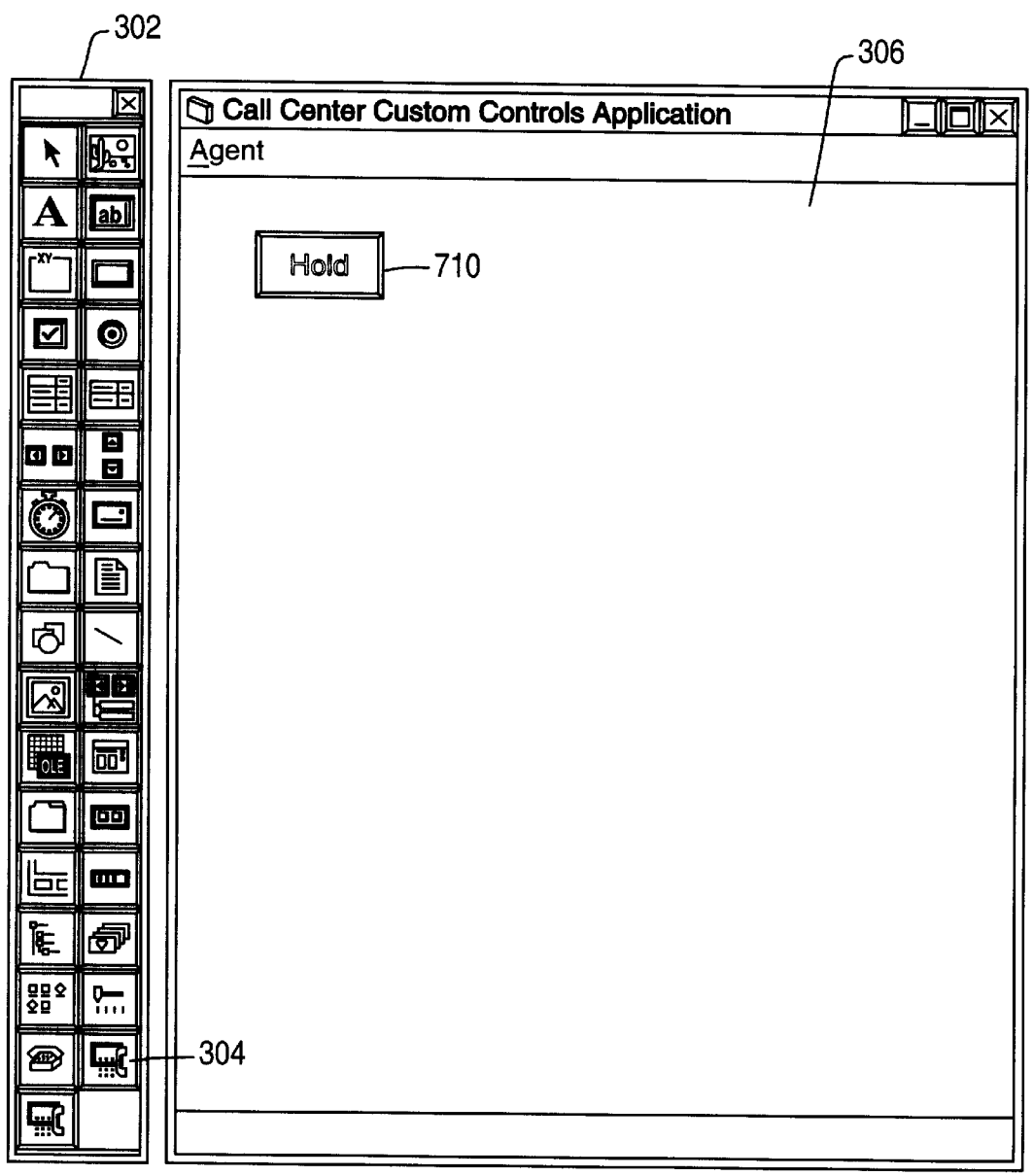

Referring to FIG. 7, there is shown that command button 510 is denoted as a "Hold" command button, in response to the selection in FIG. 6A. As shown in FIG. 7, "Hold" in command button 510 is a outlined letter, indicating that when a command button is first created, it is in an inactive state.

Figure 8:
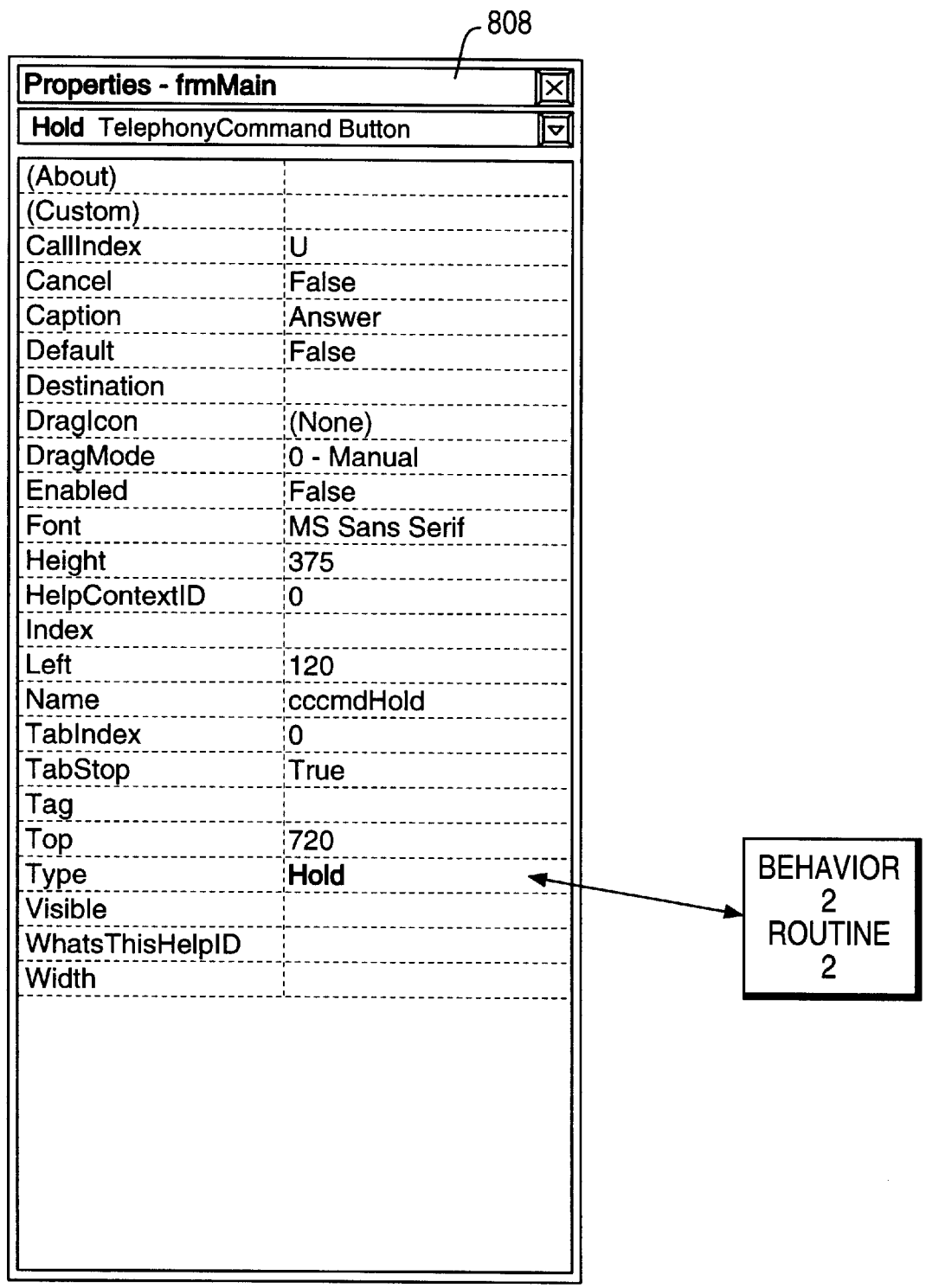

Referring to FIG. 8, there is shown a property table 802. Solid lined letter "Hold" in entry 808 indicates that this property table is defined for "Hold" command button 510.

The process of creating any one of the other types of command buttons (i.e. "Answer", "Hangup", "Aftercall", "Reconnect", "Transfer Initiation", "Transfer Complete", "Transfer Cancel", "Conference Initiation", "Conference Complete", "Conference Cancel", and "Make Call" types of command buttons) is similar to that shown in FIGS. 4–8: by (1) selecting Telephony Control symbol 304 (shown in FIG. 3), and (2) selecting a respective type entry in pull down list box 606, which automatically defines the behavior of a newly created command button, and links control program 610 and a respective routine (shown in FIG. 6A) to the newly created command button.

Alternatively, each of the command buttons can be created by a line of Visual Basic code:

cccmdButton =create(TelephonyCommandButton), and each of the command buttons can be linked to control program and a respective routine by a line of Visual Basic code:

cccmdButton.type=0, cccmdButton.type=1, cccmdButton.type=3,

. . . , or cccmdButton.type=11, where "Answer", "Hangup", "Reconnect", . . . , "Make Call" have constant values 0, 1, 3, . . . , and 11, respectively.

Figure 9:
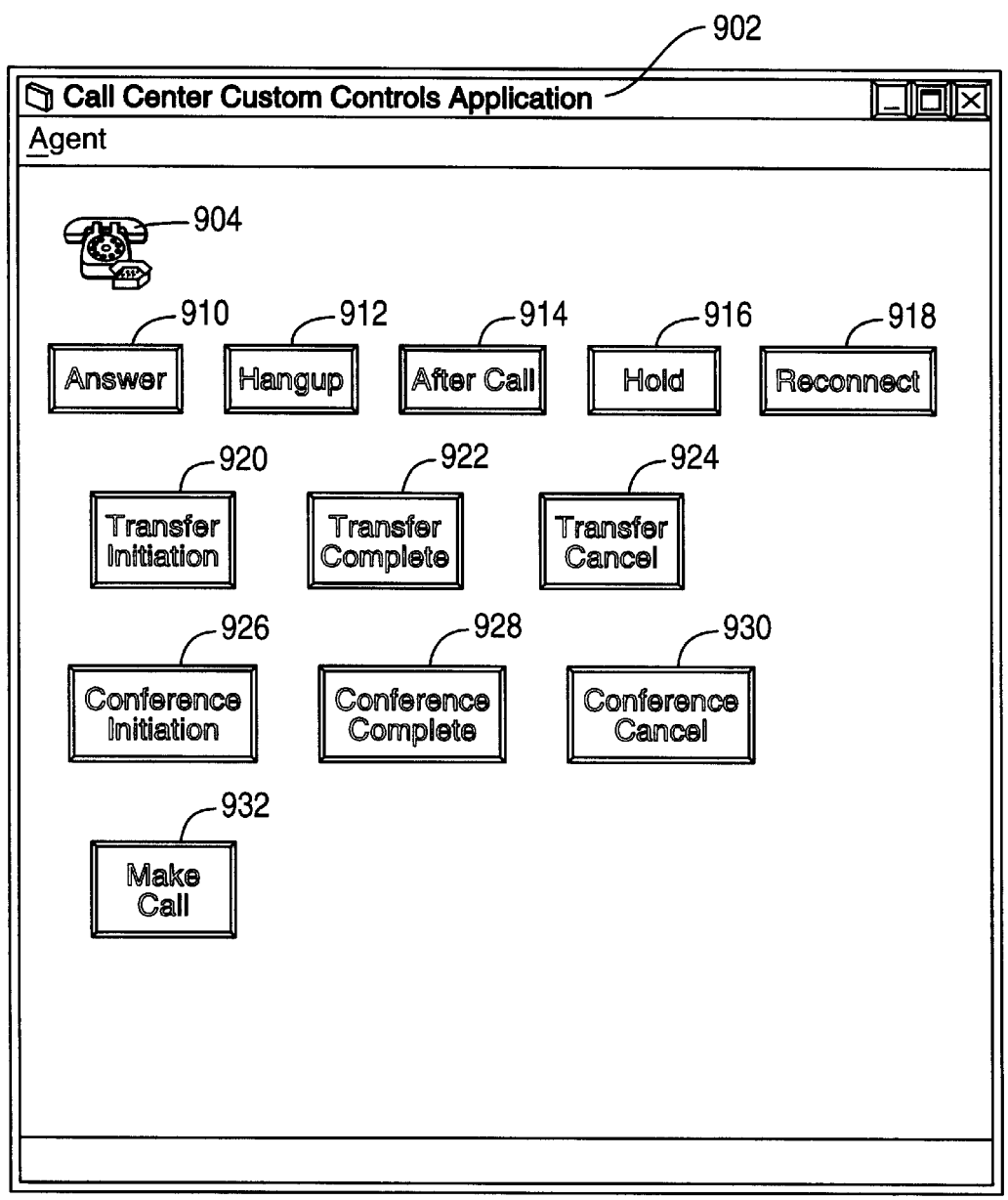

Referring to FIG. 9, there is shown a screen display 900 on workstation 107, including the twelve command buttons: "Answer", "Hang Up", "After Call", "Hold", "Reconnect", "Transfer Initiation", "Transfer Complete", "Transfer Cancel", "Conference Initiation", "Conference Complete", "Conference Cancel", and "Make Call" command buttons.

Screen display 900 also includes a "Call Center Session" icon 904. A "Call Center Session" icon can be created by selecting Call Center Secession symbol 308 (shown in FIG. 3), or by using a line of Visual Basic code.

As shown in FIG. 9, the twelve different types of command buttons, together with "Call Center Session" icon 904, are embedded into application 902 to form a graphical user interface to a CIT environment. These twelve command buttons are exemplary individual controls (or commands) in telephone controls 110 shown in FIG. 1, and "Call Center Session" icon 904 is corresponding to call center session control 109 shown in FIG. 1.

Referring to FIGS. 10A–10E, there are shown an exemplary user interface in which five individual command buttons are used to perform telephony controls. To facilitate the discussion, it is assumed that the five individual buttons shown have been embedded into a client application run on workstation 101 (see FIG. 1).

Figure 10A:
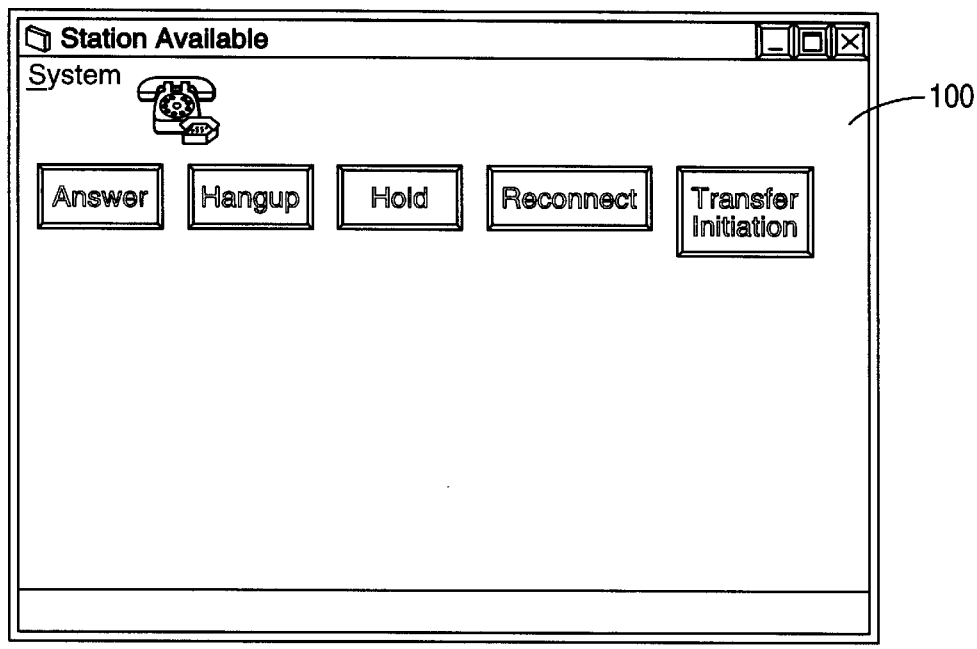
FIGS. 10A–10E show an exemplary user interface, in accordance with the present invention.

As shown in FIG. 10A, all five command buttons ("Answer", "Hangup", "Hold", "Reconnect", and "Transfer Initiation") in application container 100 are disabled (in an inactive state) as indicated by outlined letter displaying. Since these five command buttons are disabled, no control actions can be performed even if any of them is inadvertently clicked by a user.

Figure 10B:
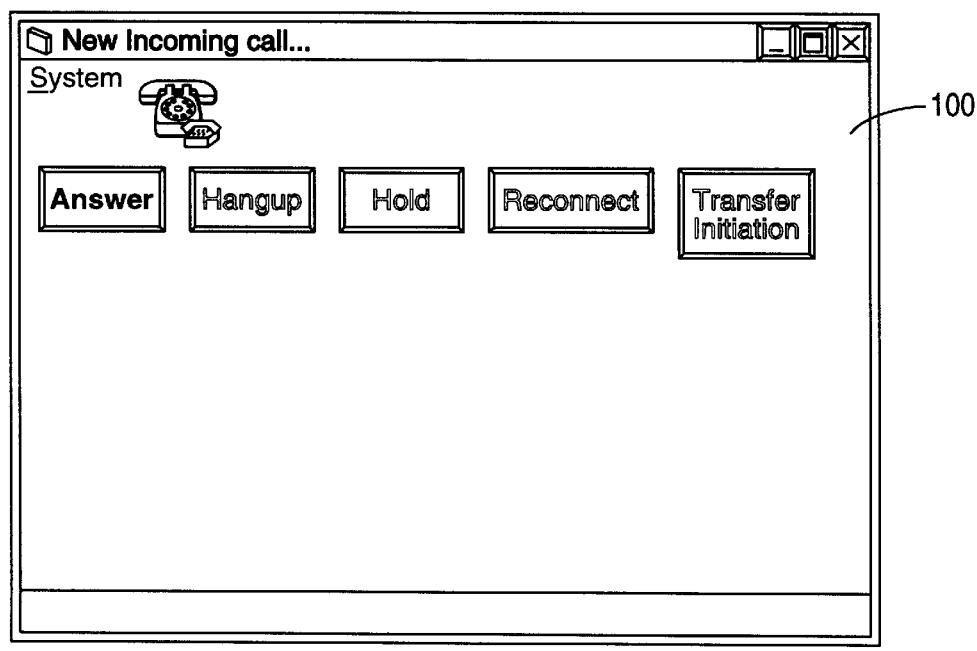

As indicated by solid letter displaying in FIG. 10B, the "Answer" command button enables itself (via control program 610), after CTI server 106 has notified, via the "Call Center Session" icon (or call center session control 109 in FIG. 1), the "Answer" command button that a call is coming. The other four command buttons are still inactive.

To answer the incoming call, a user activates (i.e. clicks) the "Answer" command button. Upon the activation, the "Answer" command button (via routine 0 shown in FIG. 6A) generates a request to CTI server 106, asking CTI server 106 to instruct telephony hardware 104 to connect the incoming call. While the incoming call is in Connected Call State (see table A in FIG. 6B), CTI server 106 notifies, via call center session control 109 (represented by the Call Center Session" icon), the "Hangup", "Hold", and "Transfer Initiation" command buttons that the incoming call has been Connected (see table A in FIG. 6B). Upon receiving the event that the incoming call has been Connected, the "Hold", "Hangup", and "Transfer Initiation" command buttons enable and the "Answer" and "Reconnect" command buttons disable themselves (via control program 610).

Figure 10C:
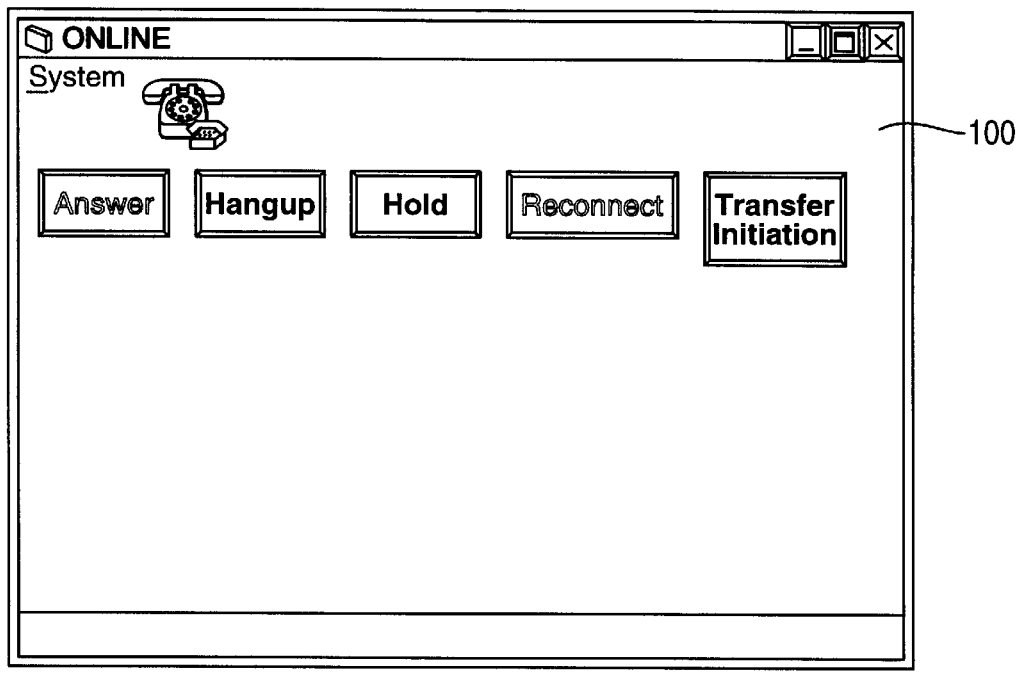

As shown in FIG. 10C, after "Answer" command button was activated, the "Hangup", "Hold", and "Transfer Initiation" command buttons are enabled (indicated by bold letter displaying), and the "Answer" and "Reconnect" command buttons are disabled (indicated by outlined letter displaying). At this time, the answered call can be either hung up, held, or transferred.

To place the incoming call on hold, the user activates (i.e. clicks) the "Hold" command button. Upon detecting the activation, the "Hold" command button (via routine 2 shown in FIG. 6A) generates a request to CTI server 106, asking CTI server 106 to instruct telephony hardware 104 to place the incoming call on hold. While the incoming call is in OnHold Call State (see FIG. 6B), CTI server 106 notifies, via call center session control 109 (represented by the Call Center Session" icon), the "Hold", "Reconnect" and "Transfer Initiation" command buttons that the incoming call is in OnHold Call State (see FIG. 6B). Upon receiving the event that the incoming call is in the OnHold Call State, the "Reconnect" and "Transfer Initiation" command buttons enable themselves and the "Hold" command button disables itself (via control program 610).

Figure 10D:
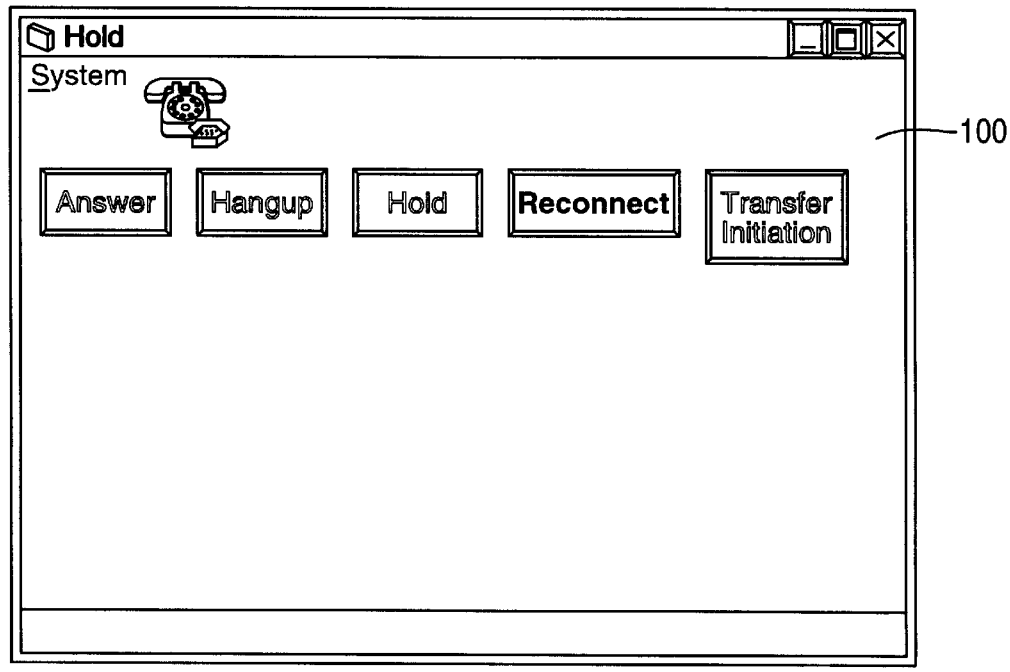

As shown in FIG. 10D, after "Hold" command button was activated, the "Reconnect" and "Transfer Initiation" command buttons are enabled (indicated by bold letter displaying), and the "Answer", "Hangup" and "Hold" command buttons are disabled (indicated by outlined letter displaying). At this time, the held call can be either reconnected or transferred.

To reconnect an on hold call, the user activates (i.e. click) the "Reconnect" command button. Upon activation, the "Reconnect" command button (via routine 3) generates a request to CTI server 106, asking CTI server 106 to instruct telephony hardware 104 to connect the on-hold call. While the on-hold call is in Connected Call State (see FIG. 6B), the CTI server 106 notifies, via call center session control 109 (represented by the Call Center Session" icon), the "Hangup", "Hold", and "Transfer Initiation" command buttons that the on-hold call has been Connected (see FIG. 6B). Upon receiving the event that the on-hold call has been Connected, the "Hold", "Hangup", and "Transfer Initiation" command buttons enable themselves and the "Reconnect" disables itself (via control program 610).

Figure 10E:
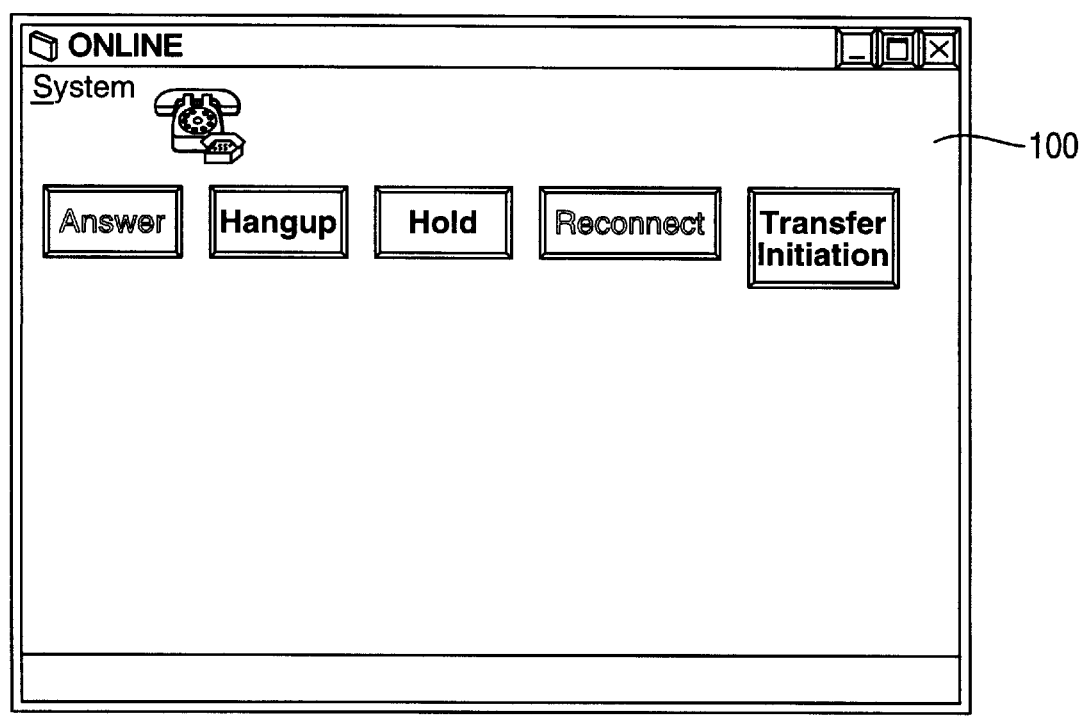
Figure 11A:
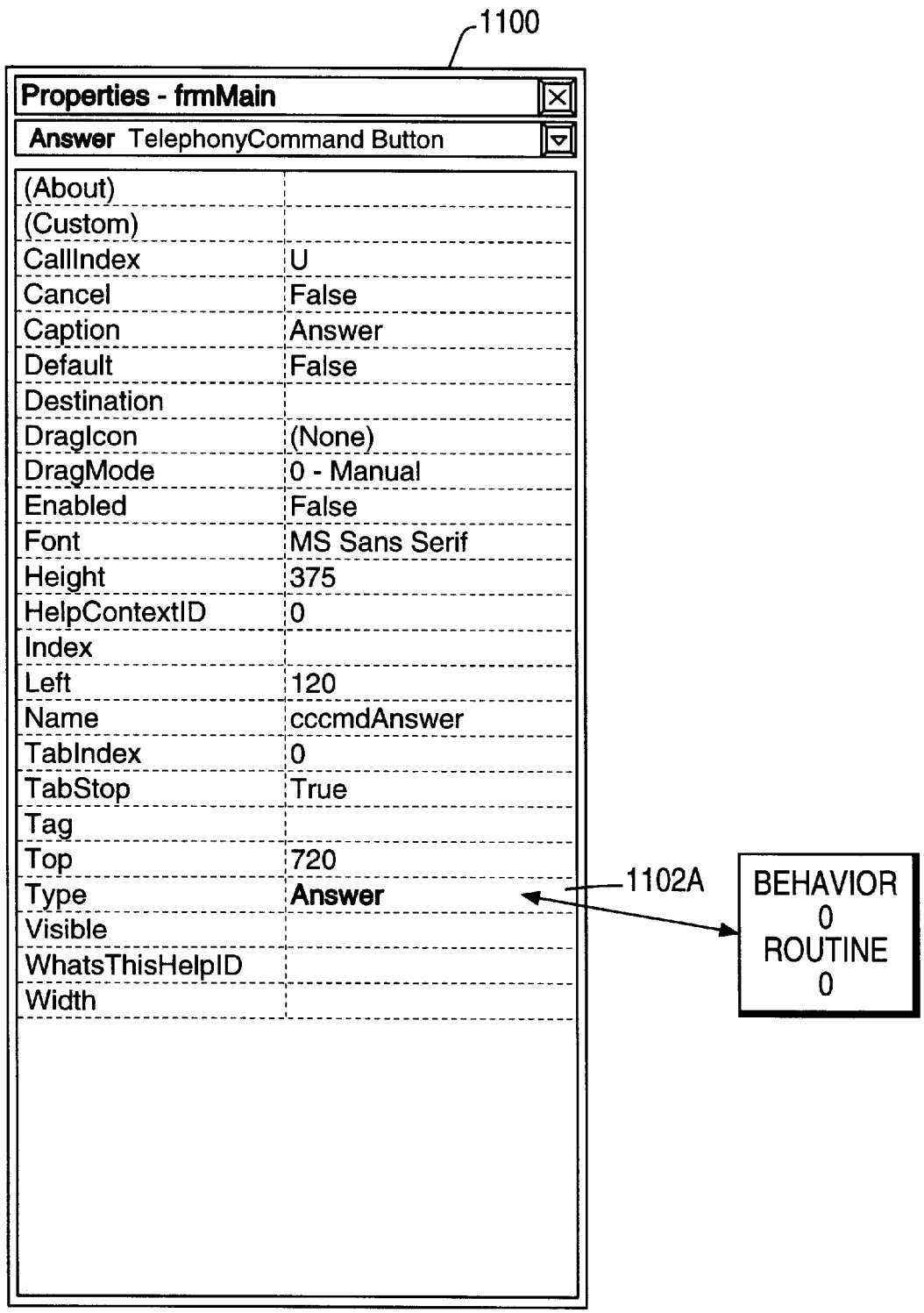
FIGS. 11A–11L show twelve property tables for the twelve types of command buttons shown in FIG. 9.
Figure 11B:
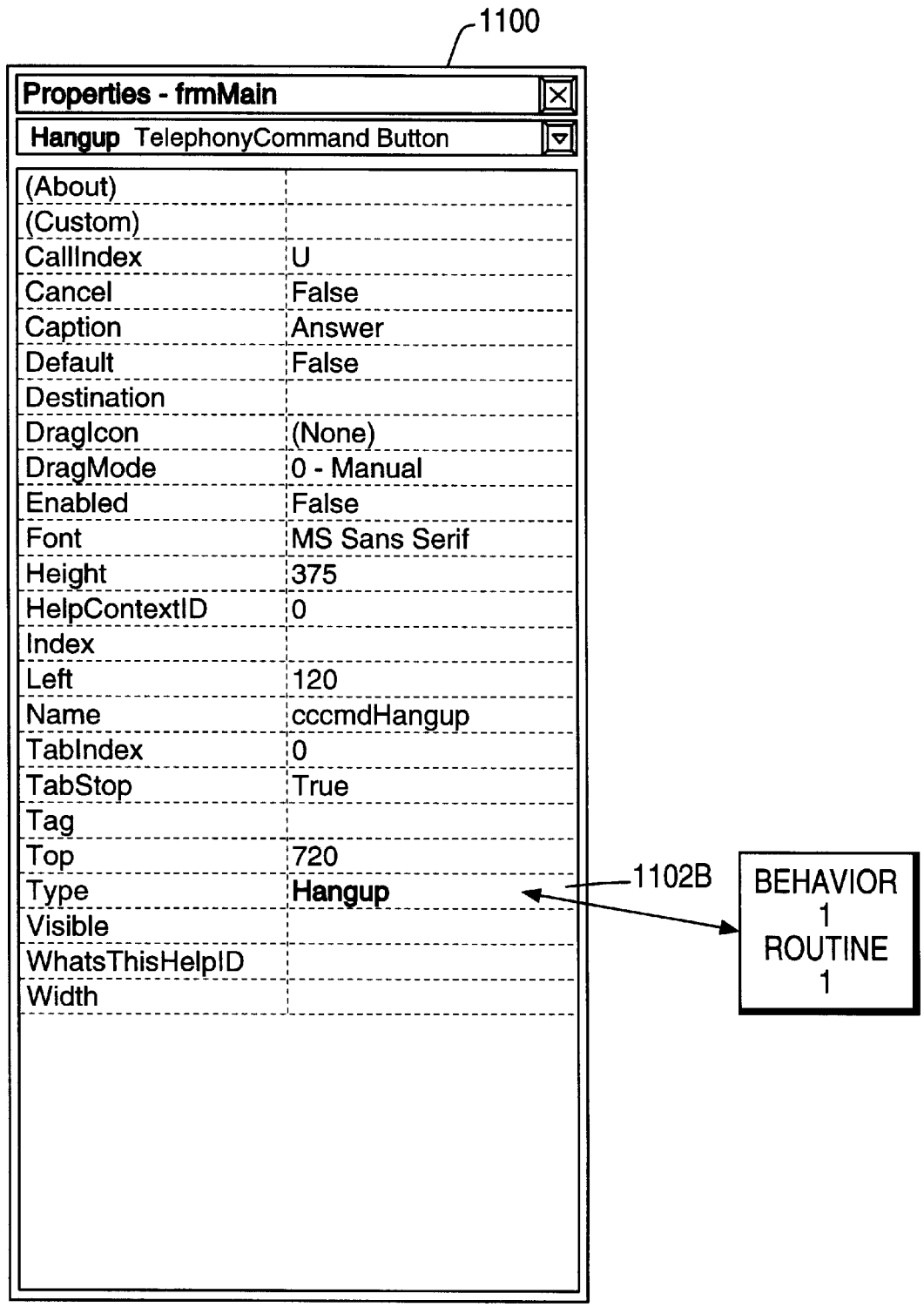
Figure 11C:
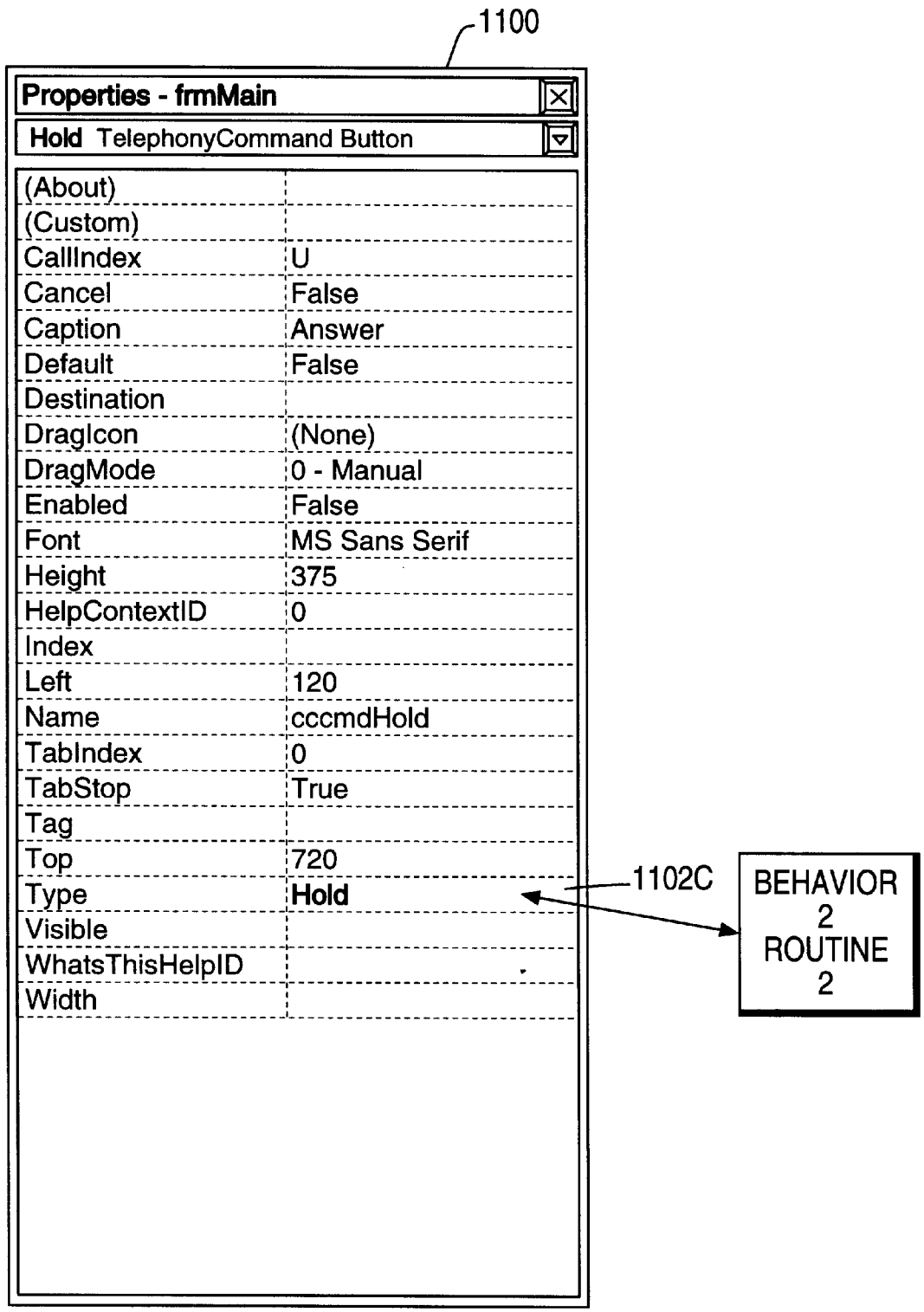
Figure 11D:
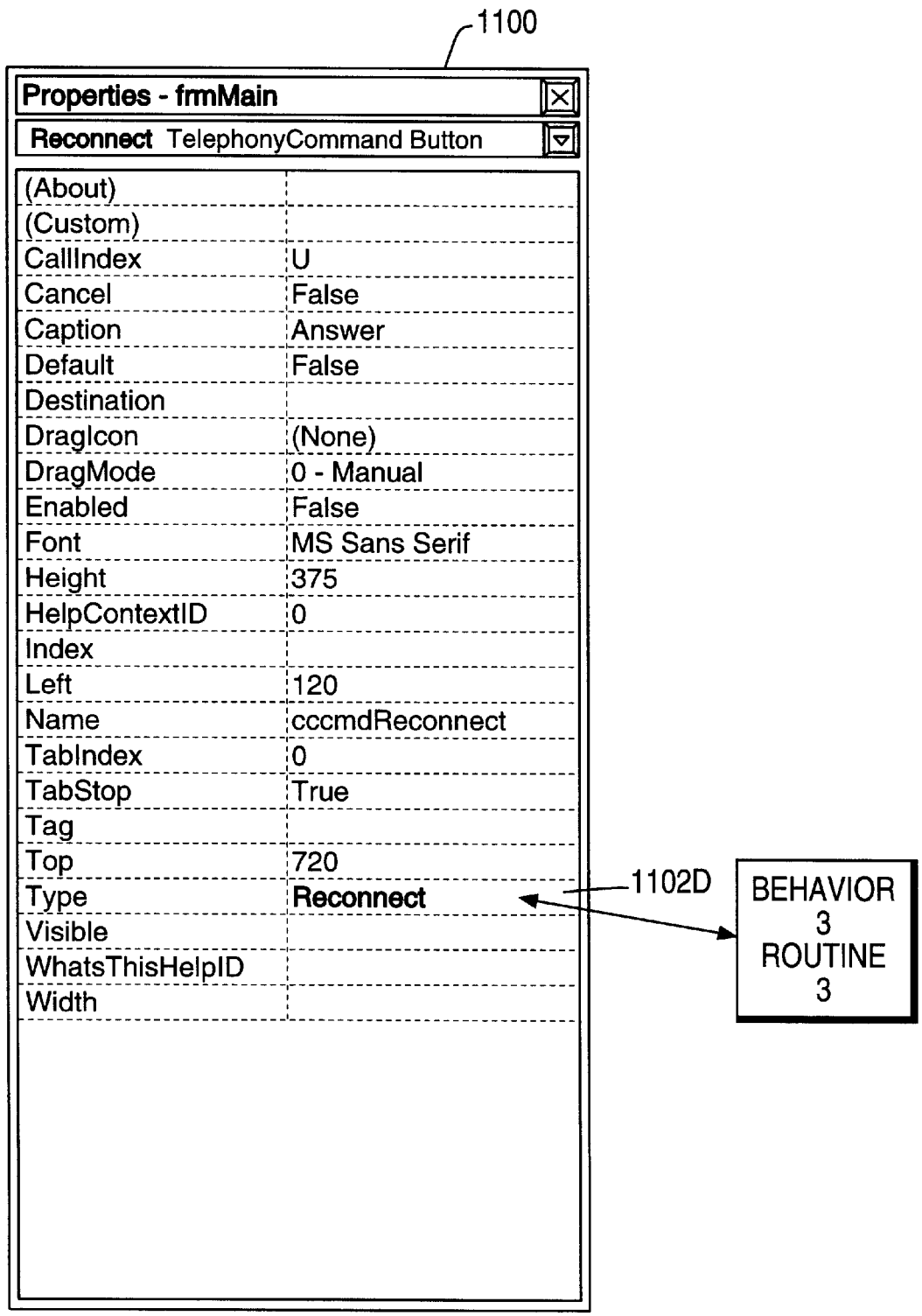
Figure 11E:
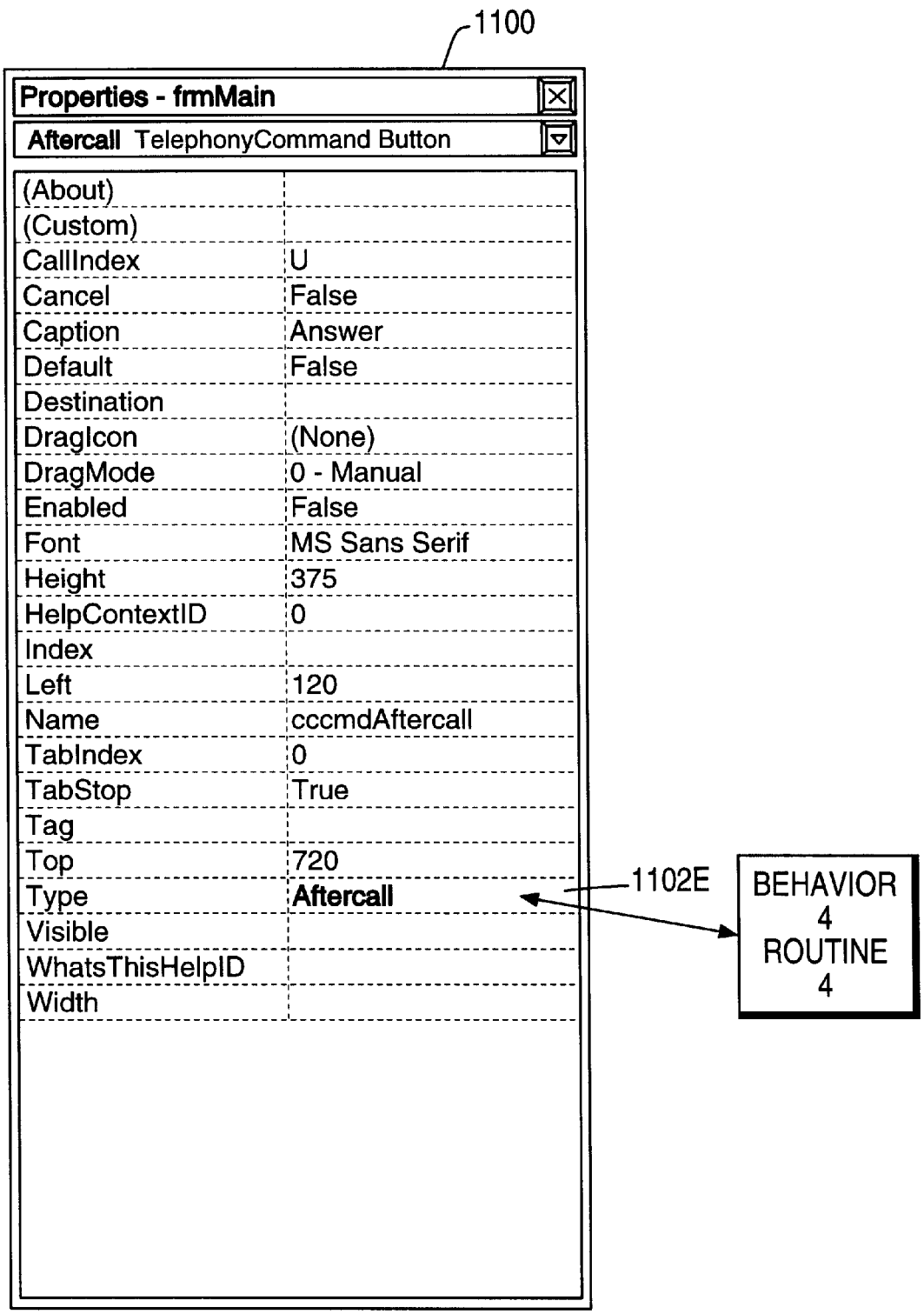
Figure 11F:
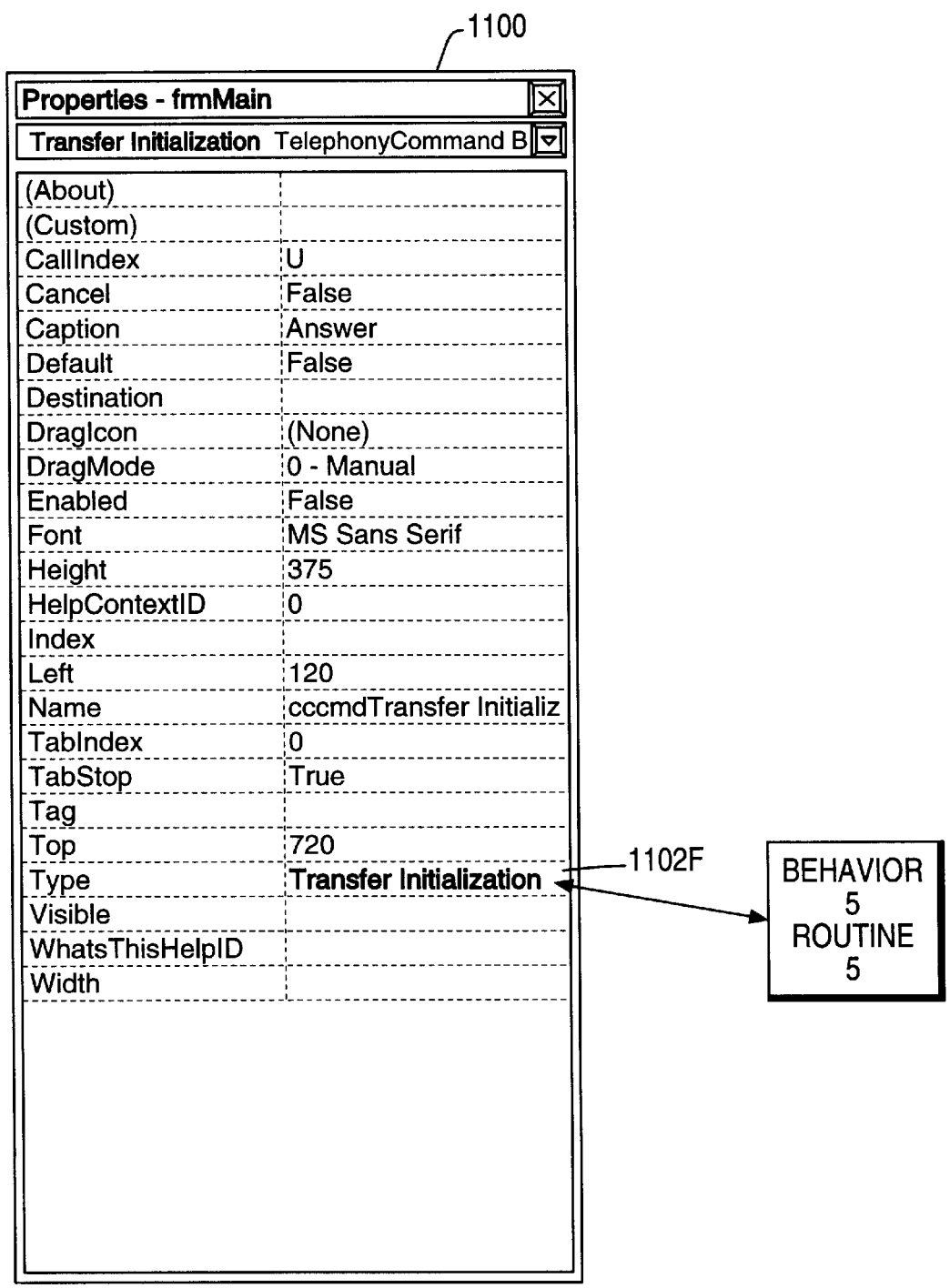
Figure 11G:
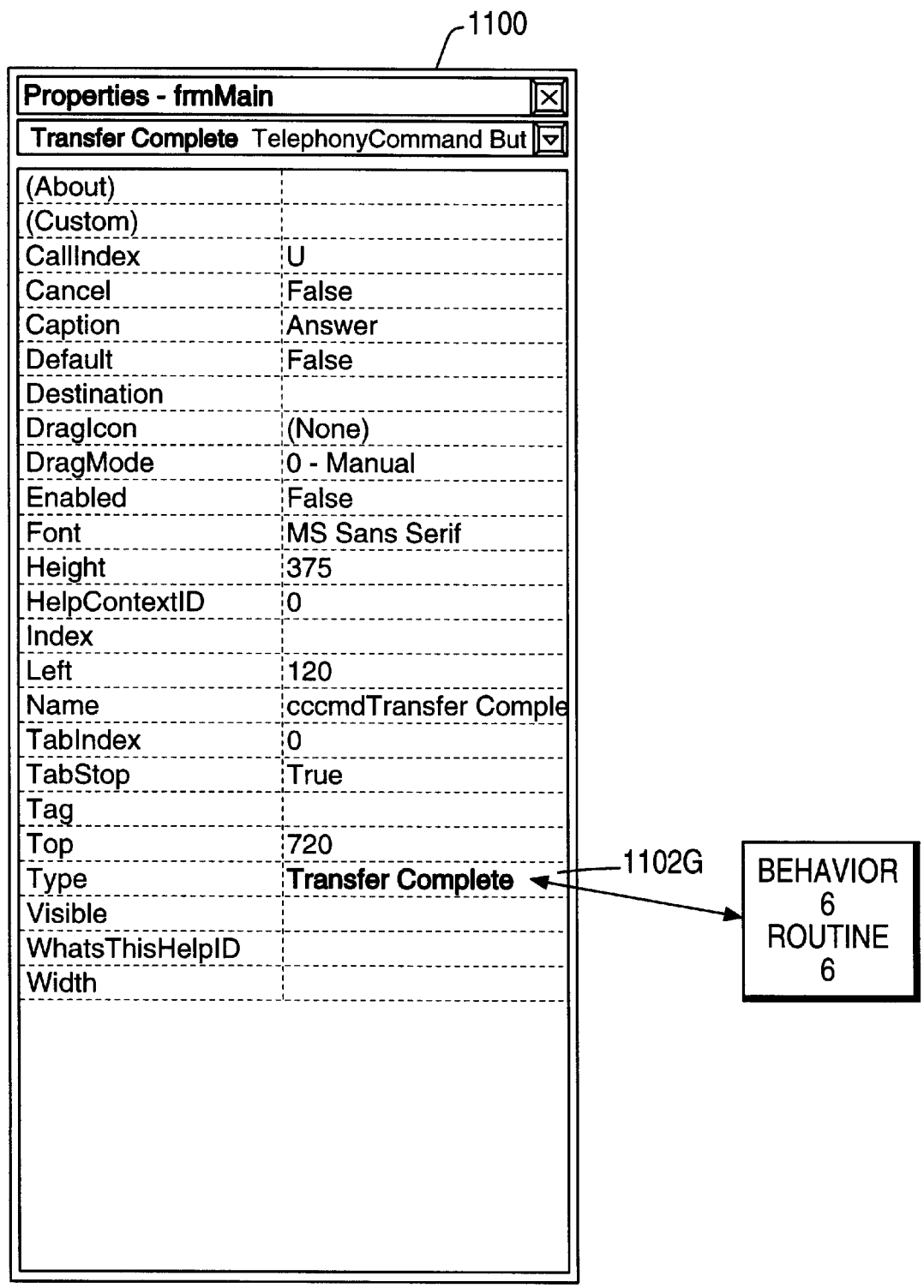
Figure 11H:
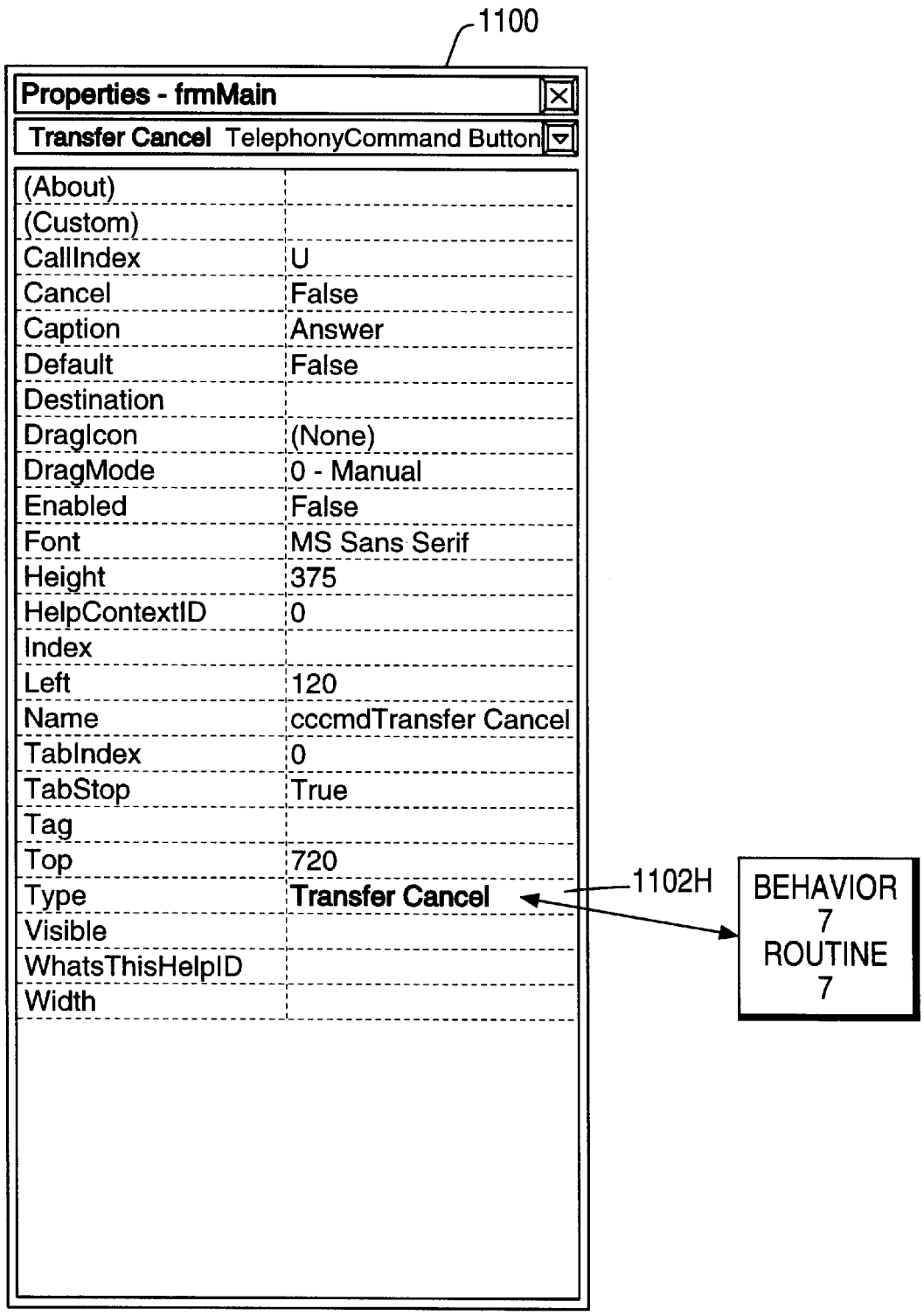
Figure 11I:
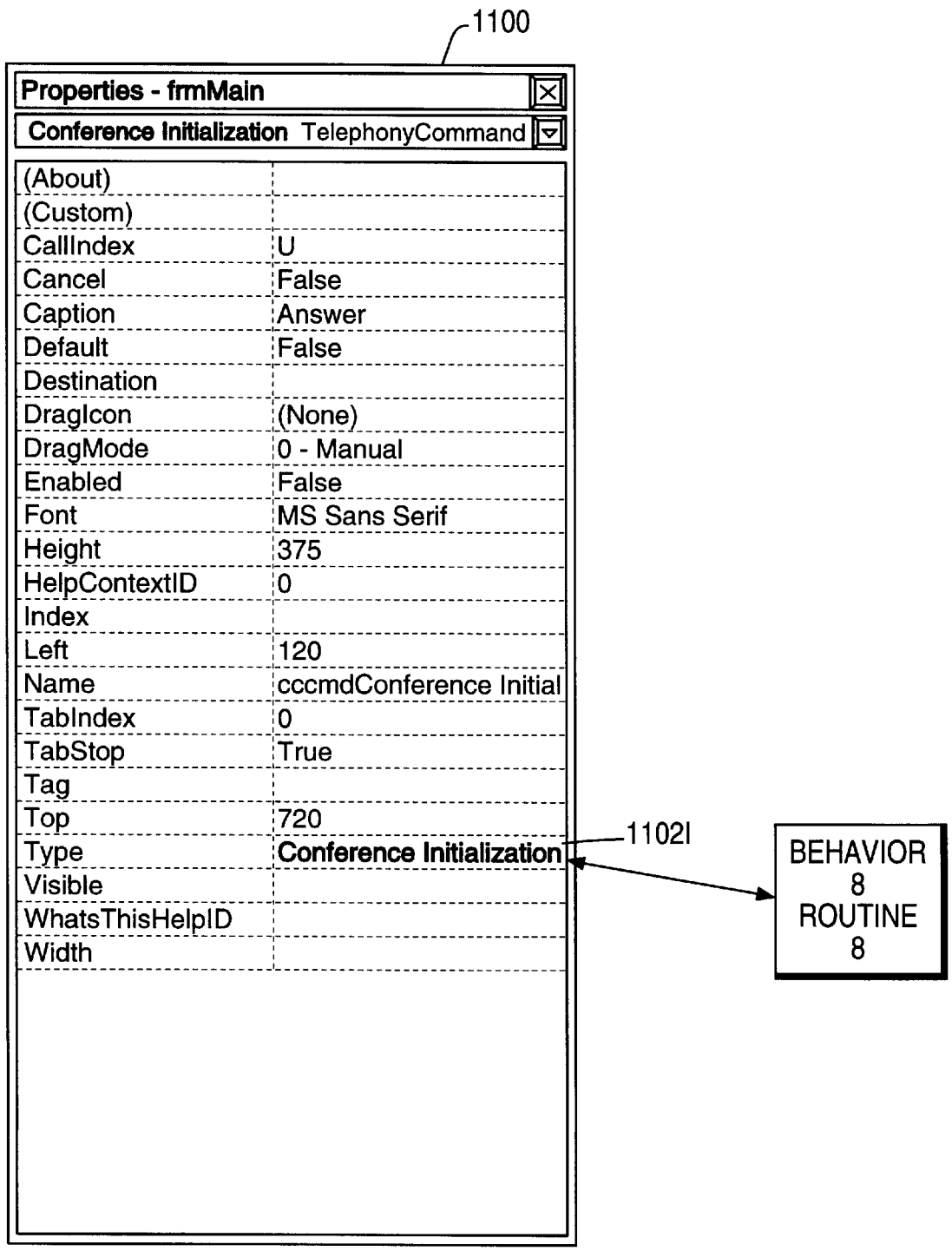
Figure 11J:
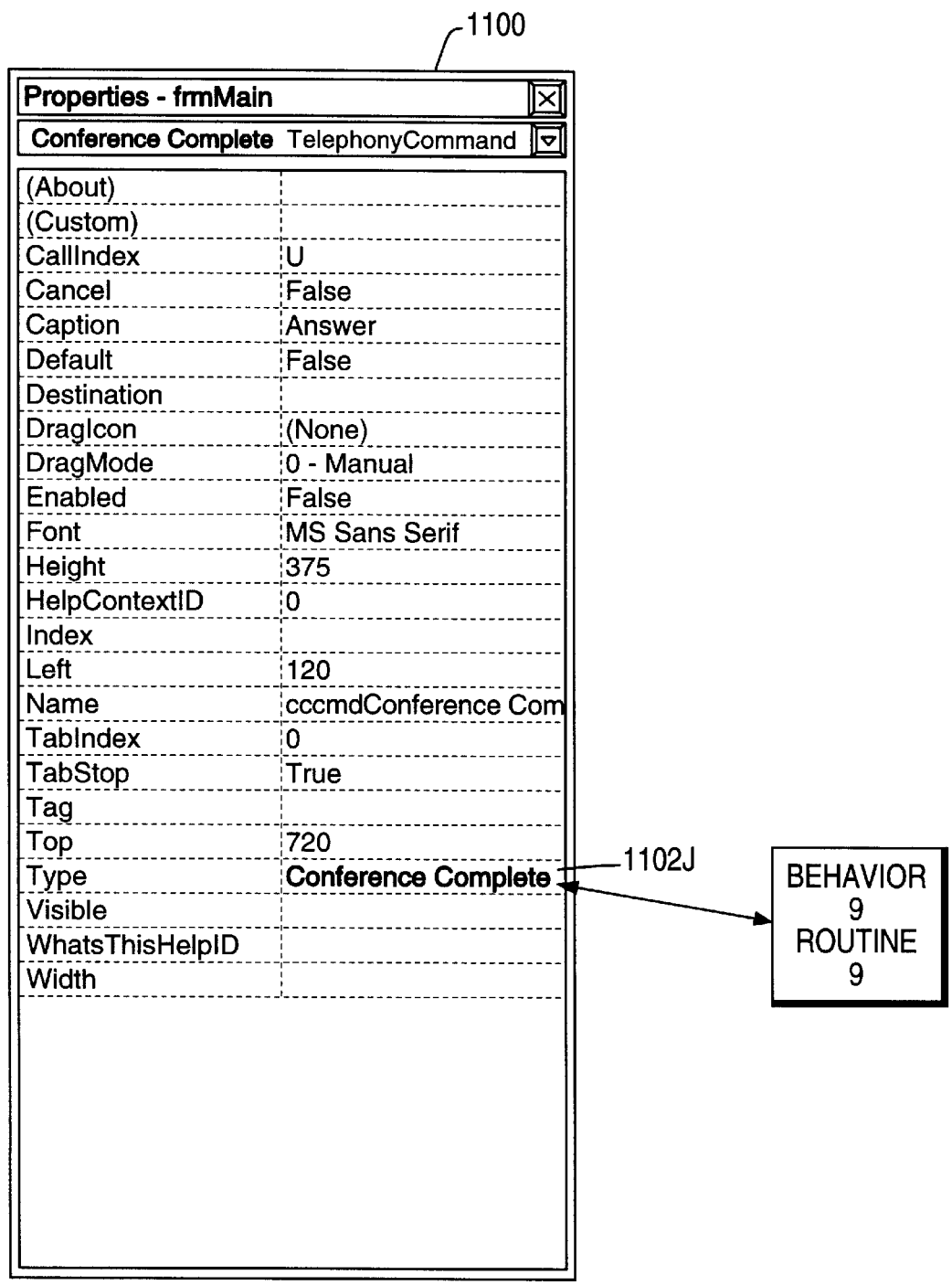
Figure 11K:
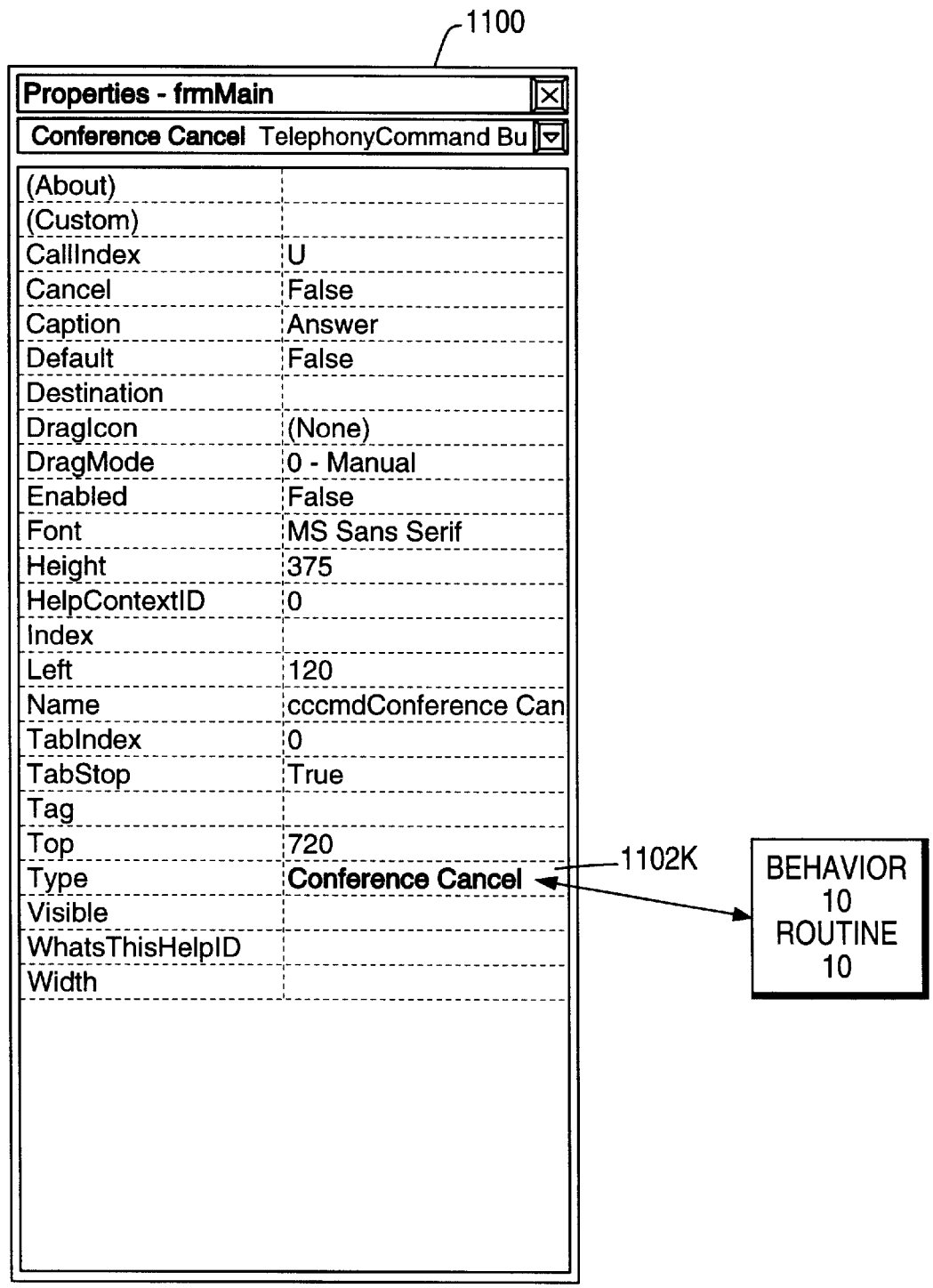
Figure 11L:
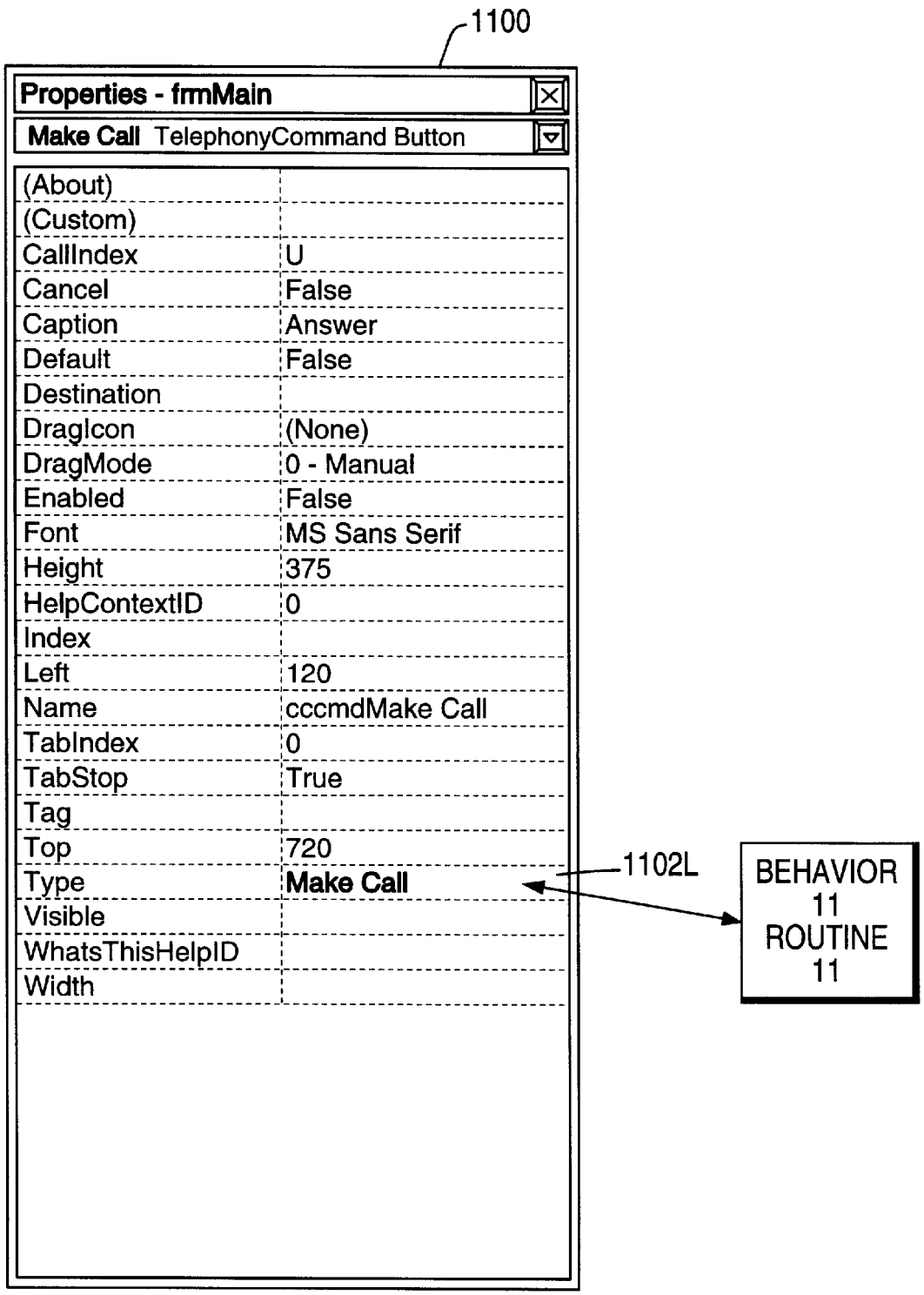

As shown in FIG. 10E, after the "Reconnect" command button was activated, the "Hangup", "Hold", and "Transfer Initiation" command buttons are enabled (indicated by bold letter displaying), and "Answer" and "Reconnect" command buttons are disabled (indicated by outlined letter displaying). At this time, the reconnected call can be hung up, held, or transferred.

Referring to FIGS. 11A–11L, there are shown twelve property tables for the twelve types of command buttons shown in FIG. 9 and the routines that are linked to the command buttons.

Figure 12:
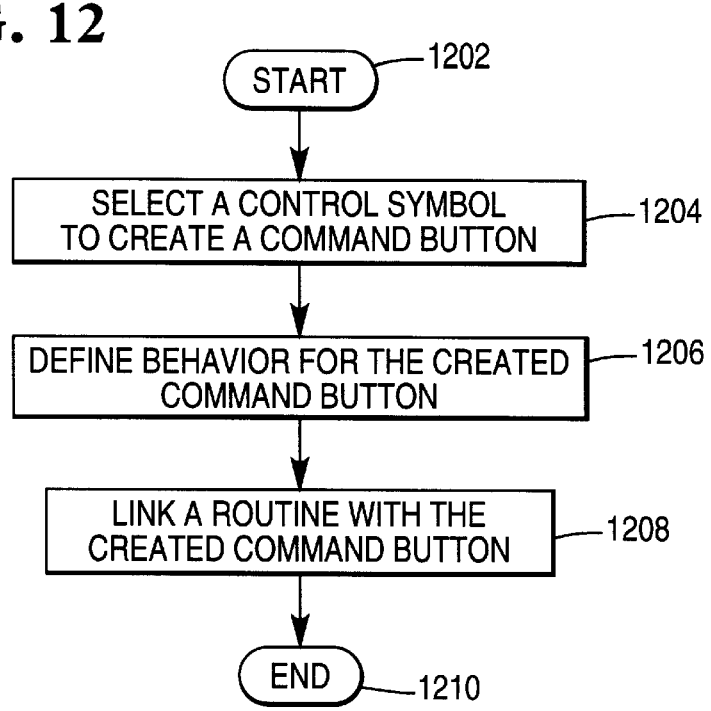
FIG. 12 is a flowchart of the process for creating a command button, in accordance with the present invention.

Referring to FIG. 12, there is shown a flowchart illustrating the operation of creating a command button, in accordance with the present invention.

At step 1204, a user creates a command button in an application container (see FIG. 5) by selecting control symbol 304 or by using a line of code.

At step 1206, the user displays property table 602 by right clicking on the command button created, and defines the behavior attributed to the created command button by selecting a respective entry in pull down list box 606 (see FIG. 6A) or by using a line of code.

At step 1208, in response to the selection (or the line of code) in step 1206, control program 610 and a respective routine are automatically linked with the created command button (see FIGS. 6A and 8).

Figure 13:
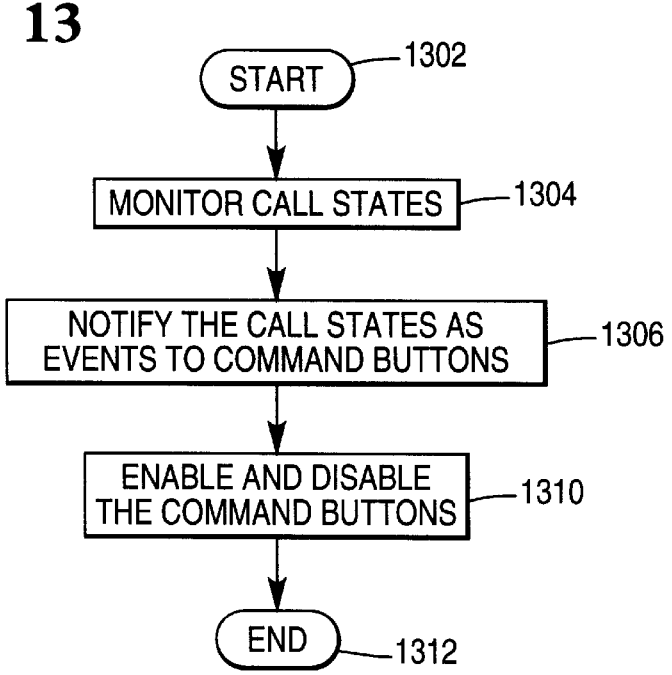
FIG. 13 is a flowchart of the process for enabling and disabling a command button, in accordance with the present invention.

Referring to FIG. 13, there is shown a flowchart illustrating the operation of enabling and disabling command buttons, in accordance with the present invention.

At step 1304, CTI server 106 monitors the call states of the telephones in CTI system 100 (see FIG. 1).

At step 1306, CTI server 106 notifies the call center session control (see element 109 shown in FIG. 1 or element 904 shown in FIGS. 10A–E) of call state changes (by sending events to it). The call center session control in turn forwards each of the events to the appropriate command buttons that are designated to respond to the events.

At step 1310, based on the events received and the behavior specified, each command button enables or disables itself according to table B (shown in FIG. 6B) via control program 610 (shown in FIG. 6A).

Figure 14:
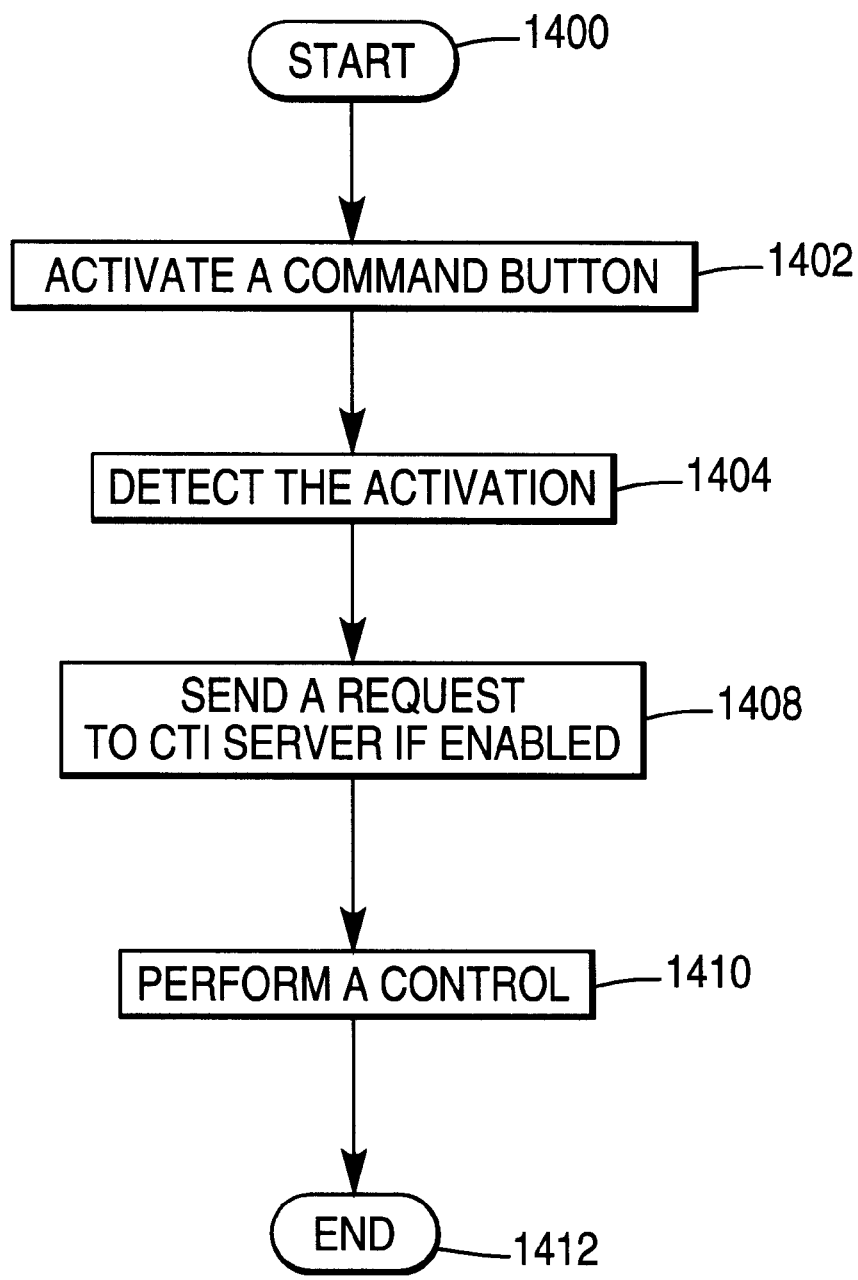
FIG. 14 is a flowchart of the process of performing a telephony control, in accordance with the present invention.

Referring to FIG. 14, there is shown a flowchart illustrating the operation of performing a telephony control by a command button, in accordance with the present invention.

At step 1402, a user activates (clicks) a command button.

At step 1404, in response to the activation, control program 610 detects the activation.

At step 1408, based on the behavior specified, the activated command button sends a request to CTI server 106, provided that the command button has been enabled.

At step 1410, via call center session control 109, CTI server 106 instructs telephony hardware 106 to perform a desired command according to the request.

Figure 15:
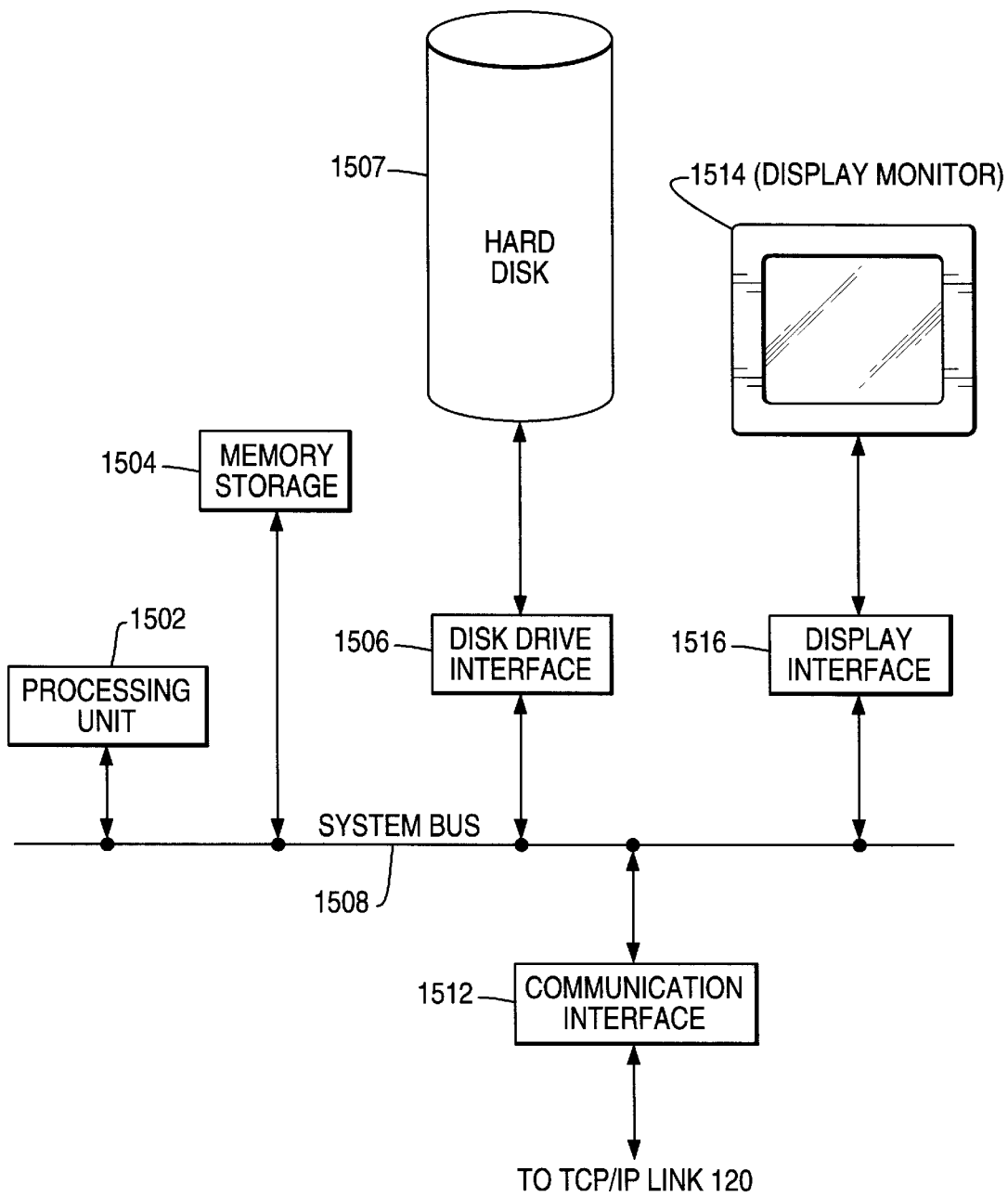
FIG. 15 is a block diagram of an exemplary hardware configuration for a work station.

Referring to FIG. 15, there is shown a block diagram illustrating one exemplary hardware configuration for workstation 107 shown in FIG. 1. It should be noted that many different hardware configurations can also be used for workstation 107.

As shown in FIG. 15, workstation 1507, which can be a PC computer, includes components: a processing unit 1502, a memory storage 1504, a disk drive interface 1506, a hard disk 1507, a communication interface 1512, a display interface 1516, and a display monitor 1514. The processing unit 1502, memory storage 1504, disk drive interface 1506, communication interface 1512, and display interface 1516 are inter-coupled with each other via a system bus 1508.

Memory storage 1504 is able to store programs and data.

Operating together with disk drive interface 1506, hard disk 1507 is also able to store programs and data. However, hard disk 1506 is nonvolatile and has higher capacity, while memory storage 1504 has faster access speed.

Operating together with display interface 1516, display monitor 1514 is able to display application interfaces that interact with application users.

Processing unit 1502 is able to execute the programs stored in memory storage 1504 or hard disk 1507, and to control the operations of the other components in workstation 107.

Communication interface 1512 is able to provide an interface between workstation 107 and TCP/IP link 120 (see FIG. 1).

Preferably, the programs (control program 610 and routines 0–11) for performing the operations shown in FIGS. 12–14 are stored in memory storage 1504 and executed by processing unit 1502.

The present invention has adequately disclosed the principle and implementations to enable a person skilled in the art to design and use the telephony control commands described above. However the processing details in routines 0–11 (shown in FIG. 6A) for performing the controls for the respective types of command buttons are specified by the particular hardware and telephony protocol used (vendor and protocol specific). The content and structure of routines 0–11 are computer language specific.

As stated above, the existing CTI development methods are often difficult to use and require CTI system developers and integrators to know the details about vendor specific telephony equipment in a CTI system and to write multiple lines of code to perform a simple task. In addition, CTI system developers and integrators are required to keep track of the operational status of the telephony equipment, such as the state of each communication line in a call center. The present invention provides two advantages over the existing methods.

First, the graphic interface is pre-programmed to generate a set of controls (commands) over a telephony equipment. If a CTI system developer needs to create a specific control (command) over the telephony system in an application, he/she simply selects a reusable image symbol (or uses a line of code) into the application. No additional work is required.

Second, all the command buttons have intelligence in that they dynamically interact with the CTI server, switch (PBX) and Call Center Session Control to monitor the current operational state of the telephony equipment and automatically react to the changes of the operational state.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. A method for controlling a communication system, comprising the steps of:
   (a) creating a plurality of object image symbols which are representative of different commands each of which is displayed on a visual interface for controlling and responding to the communication system;
   (b) selecting a predetermined behavior for each said created object image symbol;
   (c) based on said selected behavior, dynamically enabling and disabling said object image symbol in response to changes in operational status of the communication system;
   (d) a control over the communication system thereby being initiated by selectively activating said object symbol when said object is enabled, wherein said plurality of symbols are commonly displayed in a visually observable window and activated or deactivated while remaining in said widow; and comprising the further step of:
   (e) by utilizing a call center session control automatically linking said object image symbol with a pre-existing section code of a program based on said behavior defined, said section code for dynamically setting said object symbol in said active or inactive state, whereby all complex program codes required to properly connect individual said controls in telephony controls to a CTI environment is solely processed by said call center session control.

2. The method of claim 1, said step (d) answering an incoming call by activating said object image symbol.

3. The method of claim 1, said step (d) dropping a call by activating said object image symbol.

4. The method of claim 1, said step (d) holding a call by activating said object image symbol.

5. The method of claim 1, said step (d) reconnecting an on-hold call by activating said object image symbol.

6. The method of claim 1, said step (d) completing a call by activating said object image symbol.

7. The method of claim 1, said step (d) transferring a call by activating said object image symbol.

8. The method of claim 1, said step (d) conferencing a call by activating said object image symbol.

9. The method of claim 1, said step (d) making a call via the communication system by activating said object image symbol.

10. The method of claim 1, wherein said window occupies an entire screen of a visual display.

11. A method for controlling a communication system, comprising the steps of:
    (a) creating an object image symbol for controlling and responding to the communication system;
    (b) defining a behavior for said created object image symbol; and
    (c) based on said defined behavior, initiating a control over the communication system by creating a capability of activating said object image symbol without removing said image symbol from a visual display window occupying an entire screen of the display.

12. The method of claim 11, further comprising the step of:
    (d) automatically linking said object image symbol with a preexisting section code of a program for performing a control over the communication system.

13. The method of claim 11, said step (c) answering an incoming call by activating said object image symbol.

14. The method of claim 11, said step (c) dropping a call by activating said object image symbol.

15. The method of claim 11, said step (c) holding a call by activating said object image symbol.

16. The method of claim 11, said step (c) reconnecting an on-hold call by activating said object image symbol.

17. The method of claim 11, said step (c) completing a call by activating said object image symbol.

18. The method of claim 11, said step (c) transferring a call by activating said object image symbol.

19. The method of claim 11, said step (c) conferencing a call by activating said object image symbol.

20. The method of claim 11, said step (c) making a call via the communication system by activating said object image symbol.

* * * * *